United States Patent
Pettey et al.

(10) Patent No.: US 12,525,623 B2
(45) Date of Patent: Jan. 13, 2026

(54) FUEL CELL AND METHOD OF FORMING A FUEL CELL

(71) Applicant: Response Technologies, LLC, Coventry, RI (US)

(72) Inventors: David A Pettey, Portsmouth, RI (US); Richard Fox, Smithfield, RI (US); Allen S. Pettey, Westport, MA (US)

(73) Assignee: Response Technologies, LLC, Coventry, RI (US)

( * ) Notice: Subject to any disclaimer, the term of this patent is extended or adjusted under 35 U.S.C. 154(b) by 831 days.

(21) Appl. No.: 17/837,799

(22) Filed: Jun. 10, 2022

(65) Prior Publication Data

US 2023/0402623 A1 Dec. 14, 2023

(51) Int. Cl.
*H01M 8/0276* (2016.01)
*B60L 50/72* (2019.01)
*B64C 27/00* (2006.01)
*B64D 27/355* (2024.01)
*H01M 8/04082* (2016.01)

(52) U.S. Cl.
CPC ........... *H01M 8/0276* (2013.01); *B60L 50/72* (2019.02); *B64C 27/00* (2013.01); *B64D 27/355* (2024.01); *H01M 8/04201* (2013.01); *B60L 2200/10* (2013.01); *H01M 2250/20* (2013.01)

(58) Field of Classification Search
CPC ........... H01M 8/0276; H01M 8/04201; H01M 2250/20; B60L 50/72; B60L 2200/10; B60L 3/0007; B64C 27/00; B64C 27/04; B64D 27/355; B64D 37/02
See application file for complete search history.

(56) References Cited

U.S. PATENT DOCUMENTS

| | | | |
|---|---|---|---|
| 8,220,748 B2 | 7/2012 | Fenton | |
| 8,919,376 B2 | 12/2014 | Sparks | |
| 9,352,845 B1* | 5/2016 | Albert | B64D 37/06 |
| 2016/0303799 A1 | 10/2016 | Pettey et al. | |
| 2017/0054162 A1* | 2/2017 | Rouveyre | H01M 8/04701 |

(Continued)

OTHER PUBLICATIONS

ATL, "Introductory Fuel Cell Design Guide," www.atlinc.com/pdfs/Racing/ATL-Design-Guide-8x14-FINAL-WEB.pdf, 27 pages; available Sep. 19, 2015, as best as can be determined using the Wayback Machine (see https://web.archive.org/web/20151001000000*/http://atlinc.com/pdfs/Racing/ATL-Design-Guide-8x14-FINAL-WEB.pdf).

(Continued)

*Primary Examiner* — Valentina Xavier
(74) *Attorney, Agent, or Firm* — Slater Matsil, LLP

(57) ABSTRACT

A fuel cell includes a flexible body and first and second fittings attached to the flexible body. The first and second fittings each include a first opening configured for ingress or egress of a fluid, and each include second openings extending through outer portions of the first and second fittings. The first and second fittings are more rigid than the flexible body. The fuel cell further includes a first elongated interconnect attached to the first fitting through one or more of the second openings extending through the outer portion of the first fitting and connected to the second fitting through one or more of the second openings extending through the outer portion of the second fitting such that the first elongated interconnect couples together the first and second fittings.

20 Claims, 19 Drawing Sheets

(56) References Cited

U.S. PATENT DOCUMENTS

| | | |
|---|---|---|
| 2017/0106992 A1 | 4/2017 | Hemingway |
| 2017/0259932 A1 | 9/2017 | Chasen et al. |
| 2018/0079480 A1 | 3/2018 | Plagianos et al. |
| 2020/0062415 A1 | 2/2020 | Pujol |
| 2020/0171790 A1 | 6/2020 | Wilenski et al. |

OTHER PUBLICATIONS

Breunig et al, "5 Reasons to Use FEA Over Drop Testing," XCEED Engineering & Consulting P.C., Jan. 25, 2017, 6 pages.
Cavanagh, "Fuel Bladder Leaks: Why Repairs Make Sense," https://www.aviationconsumer.com, Jan. 19, 2007, 8 pages.
Federal Aviation Administration, DOT, https://www.govinfo.gov/content/pkg/CFR-2011-title14-vol1/pdf/CFR-2011-title 14-vol1-sec27-952.pdf, 3 pages.
Yang et al., "Fluid-structure interaction analysis of the drop impact test for helicopter fuel tank," SpringerPlus (2016) 5:1573, DOI 10.1186/s40064-016-3040-5, Sep. 15, 2016, 21 pages.

\* cited by examiner

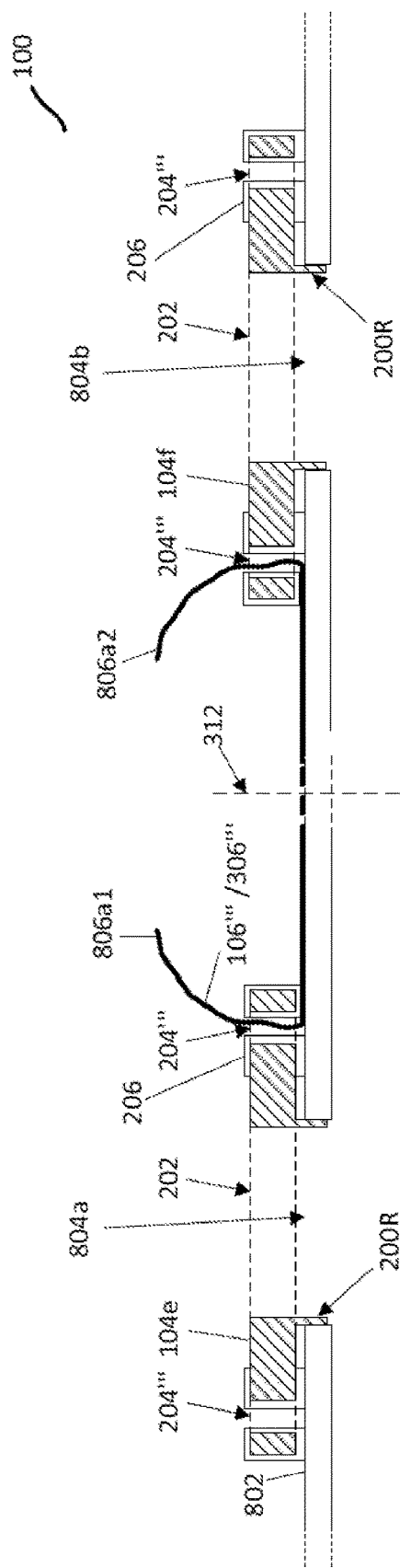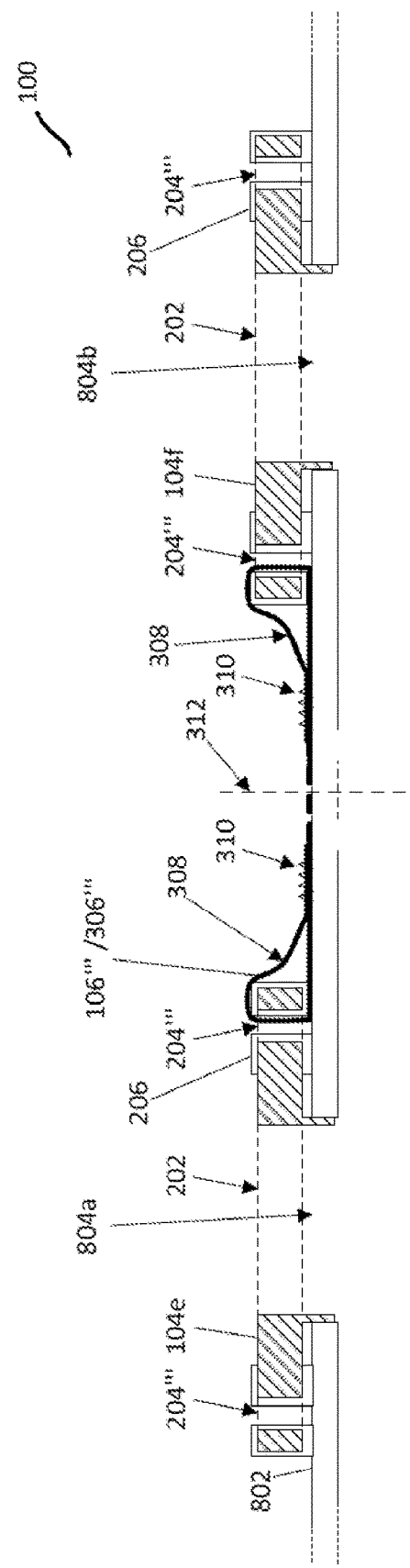

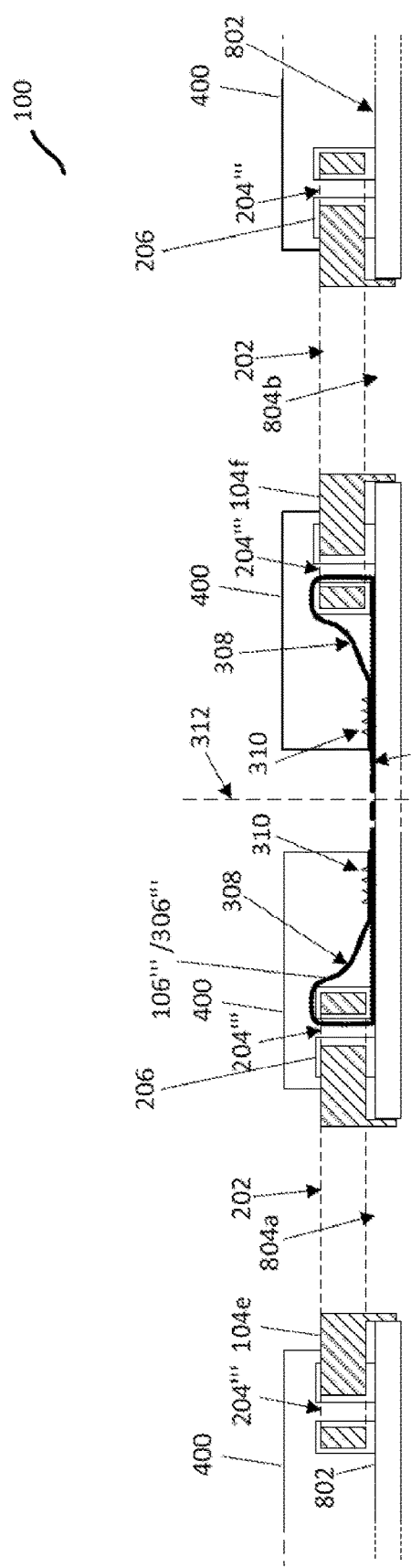
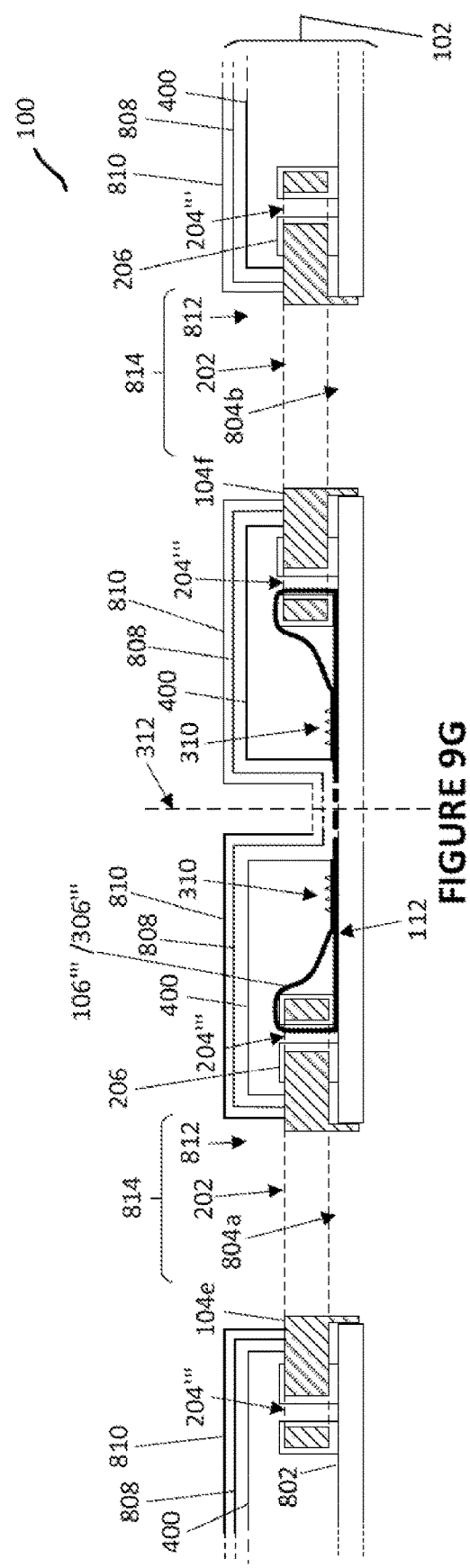
FIGURE 9F
FIGURE 9G

FUEL CELL AND METHOD OF FORMING A FUEL CELL

TECHNICAL FIELD

This disclosure relates generally to fuel systems, and, in particular embodiments, to a fuel cell and method of forming a fuel cell.

BACKGROUND

Vehicles such as cars, aircraft, and the like may include a fuel system. A fuel system includes components for storing fuel and for delivering fuel from storage to an engine and/or other component of the vehicle. As the demand for fuel efficient vehicles has increased, additional problems in fuel systems arise that should be addressed.

SUMMARY

In certain embodiments, a fuel cell includes a flexible body and first and second fittings attached to the flexible body. The first and second fittings each include a first opening configured for ingress or egress of a fluid, and each include second openings extending through outer portions of the first and second fittings. The first and second fittings are more rigid than the flexible body. The fuel cell further includes a first elongated interconnect attached to the first fitting through one or more of the second openings extending through the outer portion of the first fitting and connected to the second fitting through one or more of the second openings extending through the outer portion of the second fitting such that the first elongated interconnect couples together the first and second fittings.

In certain embodiments, a rotorcraft includes a fuel cell that includes a flexible body defining a cavity for storing fluid, fittings attached to the flexible body at respective locations of the flexible body, and interconnects. Each interconnect includes an elongated connector that is attached to a corresponding pair of fittings such that the corresponding pair of fittings are attached together via the interconnect. The rotorcraft further includes a fuel line attached to the fuel cell via one or more of the fittings and an engine connected to the fuel line.

In certain embodiments, a method includes attaching first and second fittings to a substrate for a flexible body of a fuel cell. The first fitting includes openings extending through an outer portion of the first fitting, and the second fitting includes openings extending through an outer portion of the second fitting. The method includes attaching an elongated interconnect to the first fitting through one or more of the openings extending through the outer portion of the first fitting and attaching the elongated interconnect to the second fitting through one or more of the openings extending through the outer portion of the second fitting such that the elongated interconnect couples together the first and second fittings.

BRIEF DESCRIPTION OF THE DRAWINGS

For a more complete understanding of this disclosure, and advantages thereof, reference is now made to the following descriptions taken in conjunction with the accompanying drawings, in which:

FIGS. 9A-9G illustrate cross-sectional view of a portion of a fuel cell during a process for forming the fuel cell, according to certain embodiments;

DETAILED DESCRIPTION OF ILLUSTRATIVE EMBODIMENTS

Figure 1A:
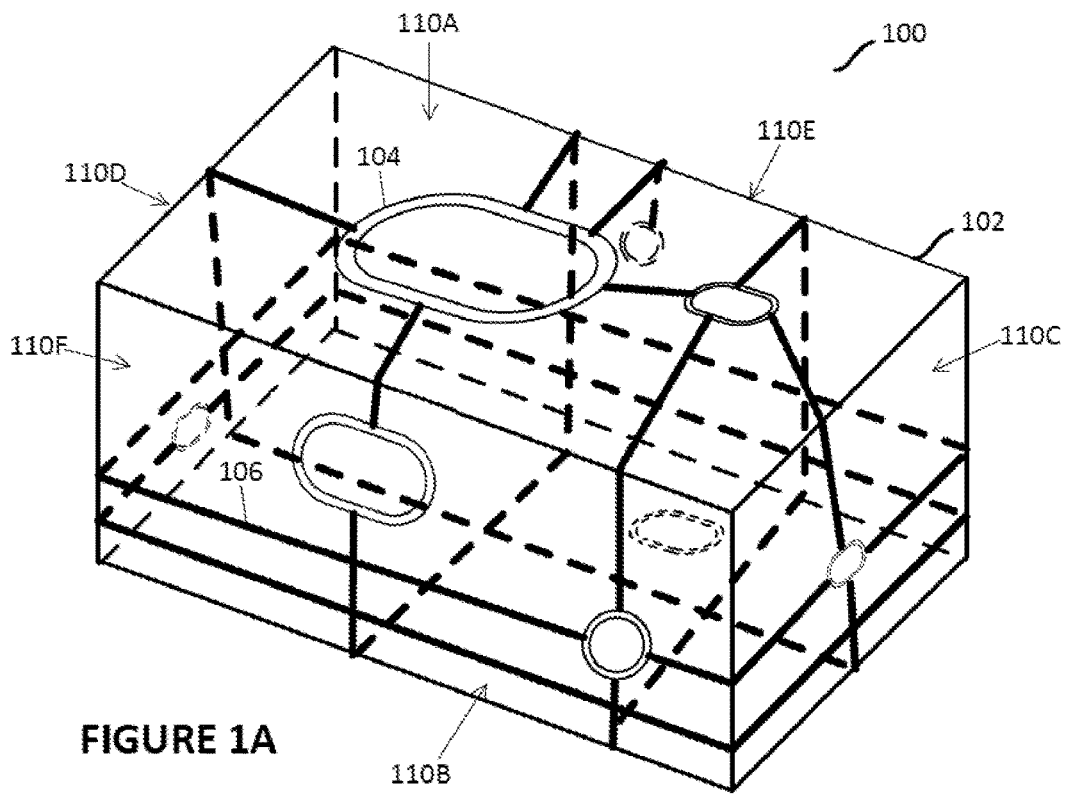
FIGS. 1A-1B illustrate both transparent and opaque views, respectively, of an example fuel cell, according to certain embodiments.

Embodiments of this disclosure relate to fluid containers, such as fuel cells. Fuel cells may include a body portion made from a flexible material, which may be constructed from multiple layers of materials that are bonded or otherwise adhered together to provide a flexible container for carrying a fluid, such as fuel. Fuel cells also may be referred to as fuel tanks or fuel bladders. The flexible property of the flexible body may provide certain advantages. In general, more flexible fuel cells may be easier to install and/or maintain. Due in part to the ability of flexible fuel cells to expand and contract as the quantity of fluid inside the fuel cell changes, flexible fuel cells may limit exposure of the fuel to air, which can reduce evaporation and increase safety by reducing the risk of combustion. A fuel cell with a flexible body may be more resistant to puncturing or able to recover from puncturing, such as from ballistic projectiles. For example, the materials used to create flexible fuel cells may include one or more layers that are self-sealing and/or are self-healing.

A fuel cell includes one or more fittings at locations of respective openings in the flexible fuel cell body. Some fittings may serve as attachment locations for attaching respective lines, such as pipes or hoses, for any of a variety of purposes. Those purposes might include refilling the fuel cell, delivering fuel from the fuel cell to a destination (e.g., an engine), venting, connecting to adjacent fuel cells (e.g., to expand storage capacity) or other suitable purposes.

Fittings typically are constructed of a rigid material, such as metal or the like. Thus, a variation in rigidity, and potentially a sharp variation in rigidity, exists at or around locations where the rigid fittings are attached to the flexible fuel cell body. This variation in rigidity also may be referred to as a stiffness gradient.

The stiffness gradient in the area of the fuel cell where the rigid fittings are attached to the flexible body can be problematic. For example, when a high impact event, such as a crash, occurs, the fuel cell may experience extreme forces. Taking a crash of an aircraft, for example, when the aircraft impacts the ground the flexible body of the fuel cell tends to flatten, or "pancake," which can impose extreme stress on the areas of the fuel cell where the rigid fittings are attached to the flexible body. Rigid fittings, particularly of a certain type (e.g., relatively large) and/or at certain locations of the flexible fuel cell body (e.g., sidewall locations), attempt to bend with the flexible fuel cell body during flattening of the flexible fuel cell body, stressing the area of the fuel cell where the rigid fittings are attached to the flexible body. This stress can lead to tearing, or shearing, between the rigid fitting and the flexible fuel cell body, and ultimately to a leak in the fuel cell.

While any fitting may experience such stress and the associated effects, certain fittings might be especially vulnerable to such stress and the associated potential for tearing at locations at or around where the rigid fitting is attached to the flexible fuel cell body. For example, in the "pancaking" scenario, fittings located on top and bottom surface may experience reduced or no stress when the fuel cell flattens as a result of the impact, as the top and bottom surfaces may remain relatively flat across relatively large areas (e.g., areas wider than the fittings located on those top and bottom surfaces). On the other hand, fittings located on side surfaces may experience greater stress as the side surfaces flatten from the impact. This may be particular true for relatively large rigid fittings, which create large areas of the flexible body where the rigidity is greater than the rigidity of the surrounding flexible body.

Additional forces also may act on the fuel cell during such an impact event, as well as during other types of events (e.g., a projectile, such as a bullet or shrapnel, impacting the fuel cell). Those additional forces may include, for example, hydrodynamic ram (HRAM) effects, which involve the forces applied by the fluid contained in the fuel cell during such an impact event. Those forces can place the areas where the rigid fittings are attached to the flexible body under additional stress, exacerbating the potential for tearing.

A tear in the fuel cell, including at or near the location where the rigid fittings are attached to the flexible body, can lead to fluid (e.g., fuel) leaks, which increases the risk of fire or explosion, placing the passengers and anyone in the area of the crash at heightened risk. Leaks also may reduce the useable range for a vehicle, which in a military application may be referred to as a mission range. For example, if a mission requires the vehicle to travel a particular distance, a leak may cause a loss of fuel that renders the vehicle unable to travel that distance, possibly leading to aborting of the journey/mission. Thus, reducing or eliminating the tearing of the fuel cell, including at or near the location where the rigid fittings are attached to the flexible body, is desirable.

Taking aircraft as an example, some governments impose regulatory requirements for rotorcraft to achieve safety certifications. Among those requirements, certain governments require the crashworthiness of a fuel cell of a rotorcraft to be evaluated using a drop test, and for the tested fuel cell to survive that drop test without developing a leak.

As just one example, at the time of filing, Title 14 of the United States Code of Federal Regulations (C.F.R.) states at section 27.952, which relates to fuel system crash resistance of rotorcraft, that "[u]nless other means acceptable to the Administrator [as defined elsewhere in Title 14] are employed to minimize the hazard of fuel fires to occupants following an otherwise survivable impact (crash landing), the fuel systems must incorporate the design features of this section." 14 C.F.R. § 27.952. The C.F.R. section continues, "These systems must be shown to be capable of sustaining the static and dynamic deceleration loads of this section, considered as ultimate loads acting alone, measured at the system component's center of gravity, without structural damage to system components, fuel tanks, or their attachments that would leak fuel to an ignition source." Id.

The C.F.R. section then defines the drop test requirements: Each tank, or the most critical tank, must be drop-tested as follows:

(1) The drop height must be at least 50 feet.
(2) The drop impact surface must be nondeforming.
(3) The tank must be filled with water to 80 percent of the normal, full capacity.
(4) The tank must be enclosed in a surrounding structure representative of the installation unless it can be established that the surrounding structure is free of projections or other design features likely to contribute to rupture of the tank.
(5) The tank must drop freely and impact in a horizontal position ±10°.
(6) After the drop test, there must be no leakage.
14 C.F.R. § 27.952(a).

In part, this drop test tests a scenario in which a flexible fuel cell is likely to flatten upon impacting the "impact surface," and provides an example scenario for evaluating a fuel cell.

Certain embodiments of this disclosure reduce or eliminate the possibility of tearing at or around locations where rigid fittings are attached to a flexible fuel cell body, and may do so in a way that is relatively lightweight, which can be important in various applications (e.g., vehicles, including aircraft). In certain embodiments, a fuel cell includes multiple rigid fittings attached to a flexible body. At least a portion of the rigid fittings are connected to one another using multiple elongated interconnects, with each interconnect connecting at least two fittings, such that the fittings are coupled together and form a network of interconnected fittings. An interconnect may include, for example, one or more connectors in the form of straps or cords. Via the interconnects, these interconnected rigid fittings can share the load of forces that affect the fuel cell during certain incidents, such as an impact event, to reduce or eliminate tearing of the flexible body at areas where the rigid fittings are attached to the flexible body.

In certain embodiments, a fuel cell includes a flexible body and rigid fittings attached to the flexible body. A first fitting includes first openings extending through an outer portion of the first fitting, and further includes a second opening configured for ingress or egress of a fluid into or out of the flexible body. A second fitting also includes first openings extending through an outer portion of the second fitting, and further includes a second opening configured for ingress or egress of a fluid into or out of the flexible body. The first and second fittings are more rigid than the flexible body of the fuel cell. The fuel cell includes a first elongated interconnect attached to the first fitting through one or more of the first openings extending through the outer portion of the first fitting and connected to the second fitting through one or more of the first openings extending through the outer portion of the second fitting such that the first elongated interconnect couples together the first fitting and the second fitting.

Figure 1B:
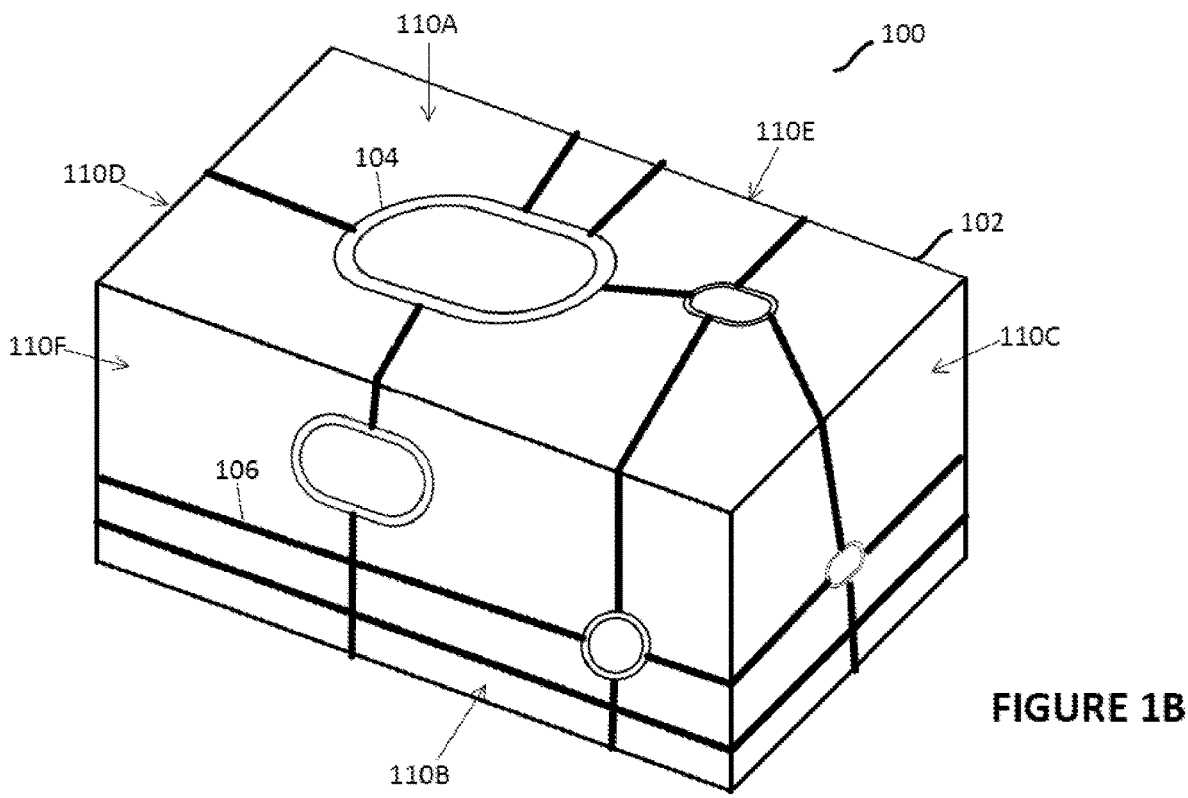

FIGS. 1A-1B illustrate both transparent and opaque views, respectively, of an example fuel cell 100, according to certain embodiments. Fuel cell 100 may be configured to store fuel or another fluid. Fuel cell 100 includes a flexible body 102 and multiple fittings 104. As described in greater detail below, fuel cell 100 includes interconnects 106 that connect some or all of fittings 104, with each interconnect 106 connecting a pair of fittings 104 or connecting a fitting 104 to itself.

Flexible body 102 is formed of one or more layers of flexible materials, such as fabric and/or composite materials, so that fuel cell 100 is a flexible fuel bag or fuel bladder that defines a cavity for storing a fluid. Flexible fuel cell bodies may be more resistant to ballistic projectiles, shrapnel, or the like than rigid fuel cell bodies, which may be advantageous when the vehicle (e.g., a rotorcraft) is used in military applications.

In certain embodiments, flexible body 102 includes multiple layers, such as an inner layer, an outer layer around the inner layer, and a middle layer between the outer layer and the inner layer. The inner layer may be formed of a fuel-tolerant material such as polyvinylidene fluoride, nylon, urethane, or the like. Any material which is substantially inert to fuel may be utilized for the inner layer. The outer layer may be formed of a puncture-resistant material such as a metal or metal alloy, or a strong synthetic fiber (e.g., KEVLAR). Any material which is substantially resistant to being pierced may be utilized for the outer layer. The middle layer may be formed of a seal-sealing and/or self-healing gel or other material, such as an elastomeric gel. Any material which is capable of expanding to self-seal and/or self-seal holes (e.g., ballistically formed holes) in flexible body 102 may be utilized for the middle layer. Although these example layers are described, flexible body 102 may include any suitable number and types of layers.

In the illustrated example, flexible body 102 (and thereby fuel cell 100) is defined by multiple sides, including a top side 110A, a bottom side 110B, a forward side 110C, an aft side 110D, a port side 110E, and a starboard side 110F. Sides 110A-110F may be referred to generally as sides 110. Flexible body 102 (and thereby fuel cell 100), however, may have any number of curved or straight sides, which each face any desired direction. Thus, although fuel cell 100 is shown to have a particular three-dimensional shape (e.g., flexible body is shown to be generally a hollow cuboid), this disclosure contemplates fuel cell 100 having any suitable three-dimensional shape, whether regular or irregular and including curved shapes (e.g., a sphere).

Fittings 104 are attached to flexible body 102, and are part of inlets/outlets for fuel cells 100. Fittings 104 also could be referred to as couplings, couplers, or the like. Fittings may be positioned on flexible body 102 at respective openings in flexible body 102. Fittings 104 may serve a variety of purposes, including, for example, ingress or egress of fluids (e.g., fuel, such as for refilling fuel cell 100 or delivering fuel from fuel cell 100 to components of a vehicle), venting, draining (e.g., a sump drain), connecting to other fuel cells, or other suitable purposes. Thus, in one example, fuel may be added to or removed from a fuel cell 100 through a fitting 104 and a fuel line connected to fitting 104. The fuel lines connected to fittings 104 may be fuel lines for delivering fuel to the components (e.g., engines) of the vehicle, fuel lines for refueling fuel cells 100, or the like.

Fittings 104 may be attached to flexible body 102 in any suitable manner. Example attachment techniques include bolt/washer combinations (e.g., an exposed plate, gasket, and nut-ring flange combination), stitching with a yarn-type material, adhesives, patch attachment structures, or any other suitable attachment technique.

Fuel cell 100 may have any suitable quantity of fittings 104 (one or more fittings 104). In certain embodiments, fuel cell 100 has from six to eight fittings 104. Fittings 104 may have any suitable sizes and shapes. In certain embodiments, fittings 104 are ring-shaped. The various fittings 104 of fuel cell 100 may have the same or different sizes and shapes, or one or more subsets of fittings 104 may have the same size and shape while others have different sizes and shapes. For example, fuel cell 100 may have a first fitting 104 of a first size and/or shape for refueling fuel cell 100, and may have a second fitting 104 of a different second size and/or shape for delivering fuel from fuel cell 100 to a component of a vehicle. In the illustrated example, some fittings 104 are circular-shaped rings and other fittings are obround-shaped (e.g., stadium-shaped) rings. Additionally, in the illustrated example, fittings 104 vary in sizes.

Fittings 104 may include one or more openings for the ingress or egress of one or more fluids or for other purposes, and the openings of fittings 104 may correspond to respective openings in flexible body 102.

Although potentially being formed of any suitable material or combination of materials, in certain embodiments, fittings 104 are formed at least in part of a rigid material. For example, the rigid material for fittings 104 may include metals such as aluminum (e.g., aluminum that may be suitable for aircraft or another suitable grade of aluminum), steel, or the like; composite materials such as a stack-up of a carbon fiber reinforcement fabric within a fuel resistant 2K urethane matrix; or the like. Fittings 104 may operate as mating points where fuel lines, which might be rigid or flexible, connect to flexible body 102 of fuel cell 100. Fittings 104 generally are more rigid than flexible body 102.

Although a single fuel cell 100 is illustrated, this disclosure contemplates coupling together multiple fuel cells, each potentially having the same or a different shape than other of the attached fuel cells. As an example, one or more of fittings 104 may be used to facilitate fuel cell-to-fuel cell coupling. The fuel cells may be coupled to one another to allow for the transfer of fuel or another fluid therebetween.

Fuel cell 100 includes interconnects 106 that connect some or all of fittings 104. An interconnect 106 may connect a fitting 104 to itself. For example, an interconnect 106 may be attached to a particular fitting 104 at a first side of the particular fitting 104 and then wrap around the perimeter of flexible body 102 and be attached to the particular fitting 104 at a second side of the particular fitting 104 (e.g., the first side of the particular fitting 104 and the second side of the particular fitting 104 being opposite sides of the particular fitting). As another example, an interconnect 106 may be attached to at least two fittings 104 such that the at least two fittings are coupled together by the interconnect 106.

Fuel cell 100 may include any suitable number of interconnects 106. Additionally, while fuel cell 100 includes at least one interconnect 106 that couples a fitting 104 to itself or that couples a pair of fittings 104, any given fitting 104 may be connected to no other fittings 104 via an interconnect 106, itself (directly) via an interconnect 106, a single other fitting 104 (directly) via an interconnect 106, or to multiple other fittings 104 (directly) via multiple respective interconnects 106. In certain embodiments, each fitting 104 of fuel cell 100 is attached to at least one other fitting 104 using an interconnect 106.

For purposes of coupling via interconnects 106, a first fitting 104 may be described as being directly coupled to a second fitting 104 via an interconnect 106 if the interconnect 106 couples the first fitting 104 to the second fitting 104 without the interconnect 106 being connected to an intervening third fitting 104 between the first fitting 104 and the second fitting 104. For purposes of coupling via interconnects 106, a first fitting 104 may be described as being indirectly coupled to a second fitting 104 if the first fitting 104 is coupled to a third fitting 104 via a first interconnect 106 and the third fitting is coupled to the second fitting 104 via a second interconnect 106. In this indirect scenario, the first fitting 104 and the second fitting 104 also could be directly coupled to one another via a third interconnect 106 between the first fitting 104 and the second fitting 104.

In certain embodiments, at least a portion of the rigid fittings 104 are connected to one another and/or to themselves using interconnects 106, potentially forming a network of interconnected fittings 104. Via interconnects 106, these interconnected rigid fittings 104 can share the load of forces that affect fuel cell 100 during certain incidents, such as an impact event, to reduce or eliminate tearing of flexible body 102 at areas where rigid fittings 104 are attached to flexible body 102.

An interconnect 106 may include one or more elongated connectors (e.g., straps or cordage structures) that connect a single fitting 104 to itself or connect multiple fittings 104 to each other. An example of an interconnect 106 that includes a single connector is described in greater detail below with reference to FIGS. 3A-3B and 4, and an example of an interconnect 106 that includes multiple connectors is described in greater detail below with reference to FIGS. 6A-6B and 7.

Interconnects 106 are elongated and generally thin and flexible. For example, interconnects 106, including the individual one or more connectors that make up each interconnect 106, may be generally narrow (e.g., having a greater length than width) elements that are thin and flexible. Interconnects 106, including the individual one or more connectors that make up each interconnect 106, may be resilient (e.g., elastic), such that they are able to substantially recover their original shape after stretching. The desired amount of elasticity will depend on particular implementations. In certain embodiments, interconnects 106 take the form of straps, cordage, or braided material. For example, in the case of an interconnect 106 that includes a single connector, interconnect 106 may include a single strap, cord, or braided element. As another example, in the case of an interconnect 106 that includes multiple connectors, interconnect 106 may include multiple straps, cords, or braided elements.

Interconnects 106 may be made of a high tensile strength and/or high shear strength material. The material could be a textile media of high tenacity fibers or another material such as high tenacity elastomers. Relatively lightweight material that still provides the appropriate tensile strength and/or shear strength may be desirable for particular applications. For example, the material of interconnects 106, and ultimately interconnects 106 themselves, may have a high strength-to-weight ratio.

As particular examples, interconnects 106 may be formed of webbing (e.g., seat-belt webbing and/or ratchet strap webbing), cordage, braided elements, or the like, and the materials of the interconnects 106 may include ultra-high-molecular-weight polyethylene (UHMWPE), aromatic polyamides (e.g., para-aramids, such as KEVLAR), nylon, polyester, polypropylene, polybenzoxazole (PBO), and high tenacity elastomers, or any other suitable natural or synthetic material or combination of materials.

Interconnects 106 may be made at least partially of high-tenacity materials that are capable of withstanding large forces. In one example, interconnects 106 are constructed from fibers, such as polyester, a 1000-denier UHMWPE filament thread having a tenacity of at least 30 grams per denier, a 1500-denier high-tenacity polyester yarn having a tenacity of at least 7.5 grams per denier, or the like. In certain embodiments, the fibers used to form interconnects 106 are bicomponent yarns, e.g., yarns including a core of a first filament component and a sheath of a second filament component. The core may have a higher tenacity than the sheath, and the sheath may have a lower melting point than the core. In certain embodiments, the sheath is a bicomponent filament having a low melting point, such as a temperature in the range of 50° C. to 200° C. For example, the bicomponent filament with a low melting point may be a polyethylene terephthalate glycol (PET-G).

As a particular example, an interconnect 106 may be webbing, which may be a strong woven fabric in the form of a flat or tubular strap and made from any suitable type of fiber, such as nylon, polyester, polypropylene, UHMWPE, aromatic polyamide (e.g., para-aramid, such as KEVLAR), or any other suitable natural or synthetic material or combination of materials. In one example, the webbing is similar to fabric that may be used for seatbelts. As an example, the webbing may include warp and weft yarns in a woven construction a fiber (e.g., a thread or yarn). In one example, the lengthwise warp fibers are held stationary in tension on a frame or loom while the transverse weft is drawn through and inserted over and under the warp. In one particular example, the webbing may be made from a fiber (e.g., nylon or polyester) and woven from about 300 warp strands and one weft strand. The webbing could be approximately 48 millimeters in width and have a tensile strength sufficient to support three metric tons; however, this disclosure contemplates the webbing having any properties that are suitable for a particular application.

As a particular example in which interconnect 106 includes one or more straps of webbing, the webbing may be UHMWPE and about 6 mm to about 40 mm wide. In an example, the webbing may have a peak breaking strength of about 2000 pounds to about 14,000 pounds. In certain embodiments, the webbing may have a fracture strain (also known as elongation at break) (e.g., the ratio between changed length and initial length after breakage of the item) of about 10% to about 50%.

As another particular example, an interconnect 106 may include one or more cord-shaped elements and be made from any suitable type material including bungee cord material, plied yarn, or any other suitable natural or synthetic material or combination of materials. In an example of bungee cord material, for example, an interconnect 106 may include a core of rubber or another resilient material and a shell encapsulating the core and made from a braided material.

As a particular example in which interconnect 106 includes one or more cords, the cords may be UHMWPE braided cords and about 2 mm to about 6 mm wide. In an example, the cords may have a peak breaking strength of about 1000 to about 9000 pounds. In certain embodiments, the cords may have a fracture strain of about 10% to about 100%.

Although particular example fracture strain values are described, interconnects 106 (including, potentially, the one or more connectors that make up an interconnect 106) may have any suitable fracture strain value that is appropriate for a given implementation. For example, interconnects 106 (e.g., one or more straps or one or more cords) with relatively greater "give" (e.g., greater than about 30%) may be appropriate for certain fuel cells, so that the interconnects 106 will stretch/lengthen as the flexible body 102 is compressing in connection with an impact event. As another example, interconnects 106 (e.g., one or more straps or one or more cords) with relatively little "give" (e.g., less than about 20%) may be appropriate for certain fuel cells, so that the interconnects 106 might more significantly restrict the ultimate compression of flexible fuel body 102 in connection with an impact event. In certain embodiments, the interconnect 106 strength (e.g., of the individual or collective one or more connectors, such as the individual or collective one or more straps or the individual or collective one or more cords) exceeds the maximum dynamic loads associated with a specified drop test or other potential impact event. Some possible interconnects 106 (e.g., straps or cords) may have a propensity for tearing flexible body 102 of fuel cell 100. In such fuel cell 100 designs, using wider connectors of interconnects 106 (e.g., wider webbing) may reduce the risk of flexible body 102 tearing during an impact event.

Some additional/related considerations regarding the materials/properties of flexible body 102 and the connectors of interconnects 106 are described. In some cases, in an impact scenario (e.g., a drop test or real-life impact event, such as a crash), the greater the time for flexible body 102 to flatten, the better due to a same force being applied over a longer period of time. This consideration suggests that a more elastic material for flexible body 102 may enhance performance. While greater elasticity of flexible body 102 may be less likely to translate to sidewall ruptures during an impact event, a greater elasticity of flexible body 102 may be more likely to translate to tearing of flexible body 102 where rigid fittings 104 attach to flexible body 102 due to an increased stiffness gradient between the flexible body 102 (of greater flexibility) and the rigid fitting 104. A more rigid flexible body 102 may result in less stress being placed on the connection region between flexible body 102 and fittings 104, particularly for fittings 104 located on the sides of fuel cells (e.g., sides 110C, 110D, 110E, and 110F of fuel cell 100), during an impact event. In an example of a flexible body 102 having increased rigidity, certain forces resulting from an impact event may be distributed over a shorter period of time (relative to a more elastic flexible body 102), though the instantaneous forces may be higher, potentially making flexible body 102 more vulnerable to rupturing at locations away from fittings 104.

With these example considerations in mind, in certain embodiments, a fuel cell 100 having no fittings 104 located on sides (e.g., sides 110C, 110D, 110E, and 110F, or non-top and bottom sides 110A/11C) of flexible body 102 might use raw materials (e.g., for interconnects 106) with fracture strain values of about 500% to about 1000% to facilitate survivability. In certain embodiments, a fuel cell 100 having fittings 104 (and potentially relatively large fittings 104) located on one or more sides (e.g., sides 110C, 110D, 110E, and 110F, or non-top and bottom sides 110A/11C) of flexible body 102 might use raw materials (e.g., for interconnects 106) with facture strain values of about 50% to about 250%, which might improve performance during a drop test or other impact event. For a particular implementation, it may be appropriate to consider the peak energy expected to be reached during a drop event or other impact event, as it may be desirable to choose materials for interconnects 106 that can support that peak energy. As a particular example, a product of the fracture strain (strain) and the peak breaking strength (stress) for particular candidate materials may be evaluated. Taking a particular example, in certain embodiments, a material having a 100% fracture strain at a 10,000 pound stress might yield the same or similar drop test performance as a material having a 500% fracture strain at 2000 pound stress. In certain embodiments, a fuel cell 100 having large side fittings 104 (e.g., sides 110C, 110D, 110E, and 110F) might perform better using the 100% fracture strain/10,000 pound stress implementation. Particular values/ranges of values are provided as examples only.

The strength of an interconnect 106 may be determined by several properties of the one or more connectors that make up the interconnect 106, and more particularly, by the materials that make up the one or more connectors. In the case of connectors that are constructed from fibers, the tenacity of the fibers contributes to the strength of the interconnect 106, with a larger tenacity resulting in a stronger connection between fittings 104. In certain embodiments, the fibers have a tenacity in the range of 5 grams breaking force per denier to 40 grams breaking force per denier. The areal density of the fibers (e.g., on the surface of the flexible body 102) also contributes to the strength of the connection made by interconnect 106, with a larger areal density resulting in a stronger connection. In certain embodiments, the fibers of the connectors of an interconnect 106 have an areal density in the range of 3 per $cm^2$ to 50 per $cm^2$. The length of the connectors of interconnect 106, including the length of the fibers that make up the connectors, (e.g., the length the connector between two fittings 104 or from one side of a fitting 104 to the opposing side of the same fitting 104) also contributes to the strength of the connection, with a larger length resulting in a stronger attachment structure. The connectors may have the same or different tenacities, the same or different densities, the same or different lengths, or the same or different radii of curvature.

Although these properties of the materials that make up interconnects 106 contribute to the strength of the interconnects 106, these properties also may contribute to the mass of the interconnects 106.

Although interconnects 106 are described as being made from particular materials, interconnects 106 may be made from any suitable material that can be used to connect fittings 104 either to themselves or to other fittings 104. Additionally, interconnects 106 may be made from a combination of materials, such as a core material and one or more coatings. For a given fuel cell 100, the interconnects 106 all may have substantially the same form or may take different forms.

Interconnects 106 may be attached to fittings 104 in any suitable manner. For example, the one or more connectors that make up an interconnect 106 may be attached to one or more fittings 104 in any suitable manner.

In certain embodiments, interconnects 106 may be threaded or otherwise inserted through holes extending through outer portions of fittings 104 such that portions of interconnects 106 form loops through the holes. For example, the one or more connectors of an interconnect 106 may be threaded or otherwise inserted through respective one or more holes extending through outer portions of fittings 104 such that portions of the one or more connectors form loops through the holes. These loops may be closed in any suitable manner to secure the one or more connectors to fittings 104.

Figure 3A:
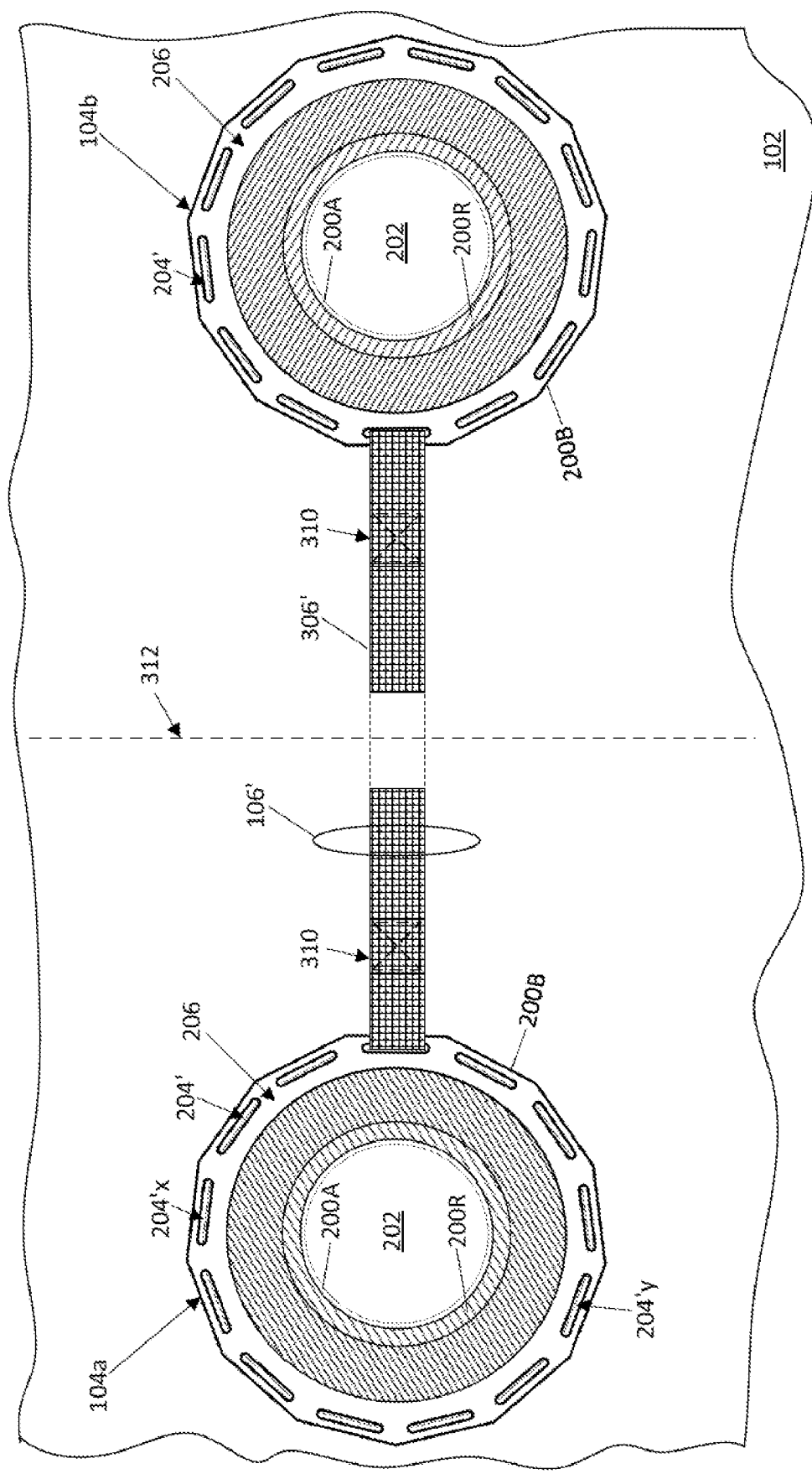
FIGS. 3A-3B illustrate top and angled views, respectively, of two fittings of the type illustrated in FIGS. 2A-2B and that are connected via an interconnect, according to certain embodiments.
Figure 3B:
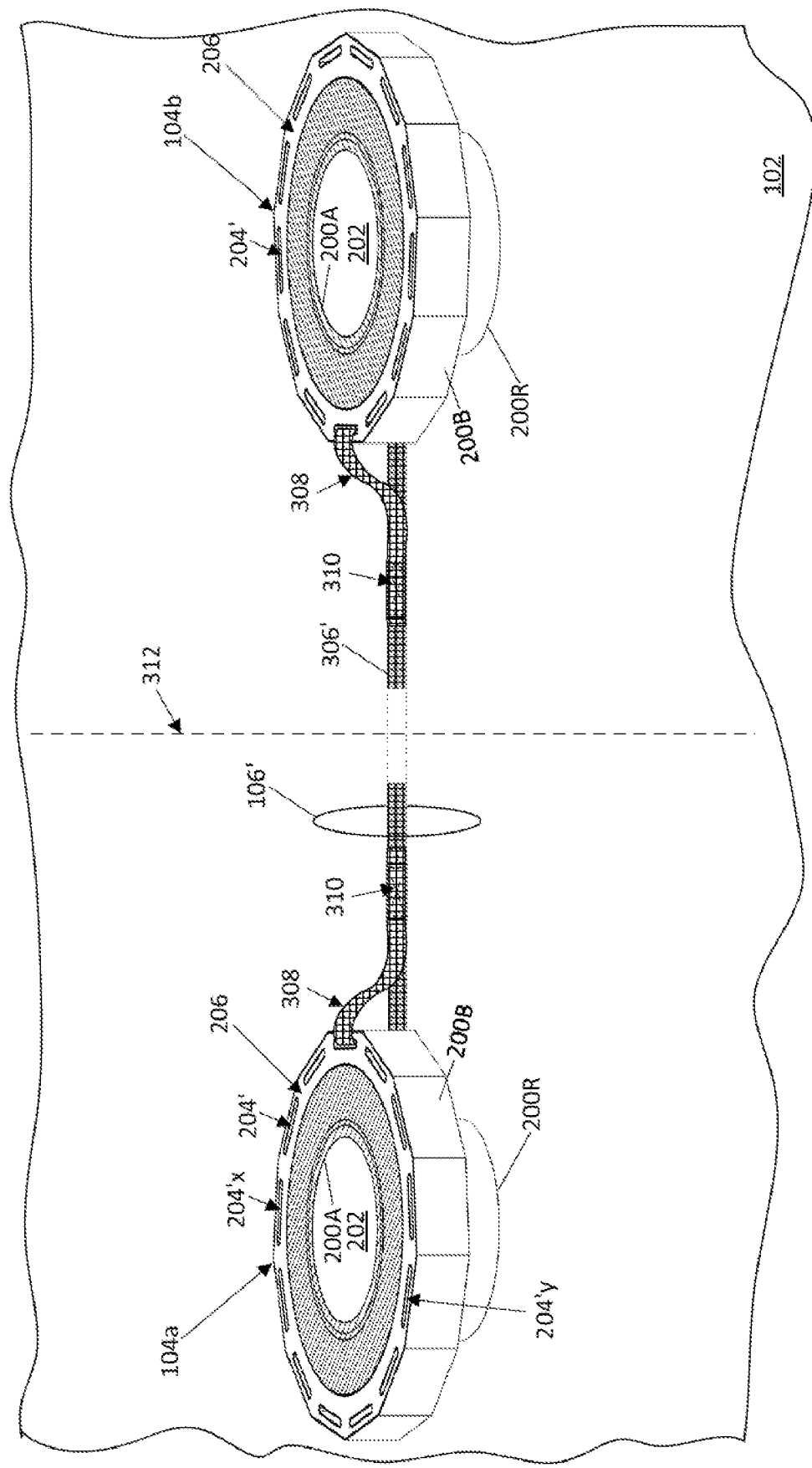
Figure 4:
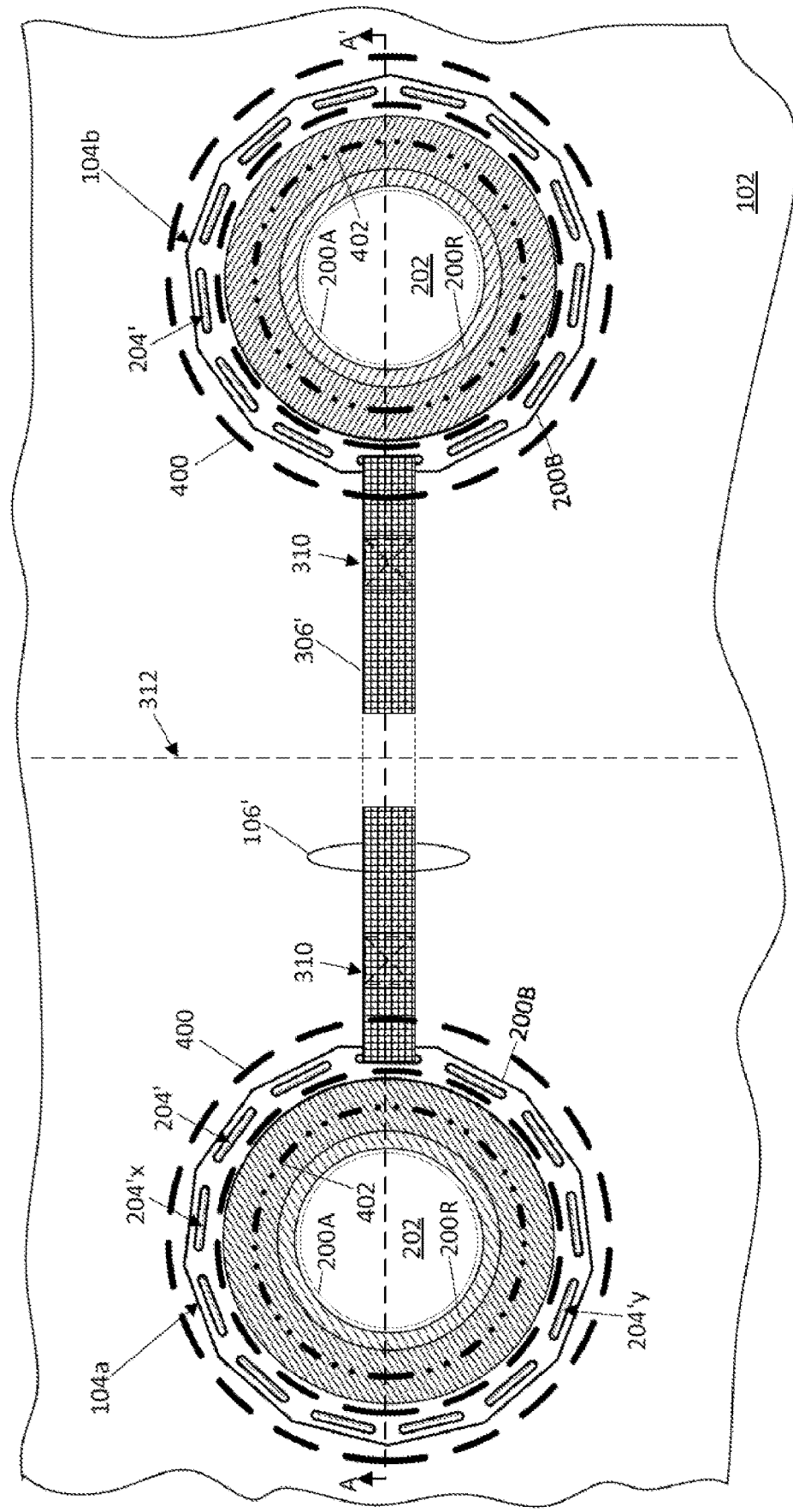
FIG. 4 illustrates a top view of a portion of a fuel cell with attached fittings of FIGS. 3A-3B and one or more additional layers formed over an interconnect, according to certain embodiments.
Figure 6A:
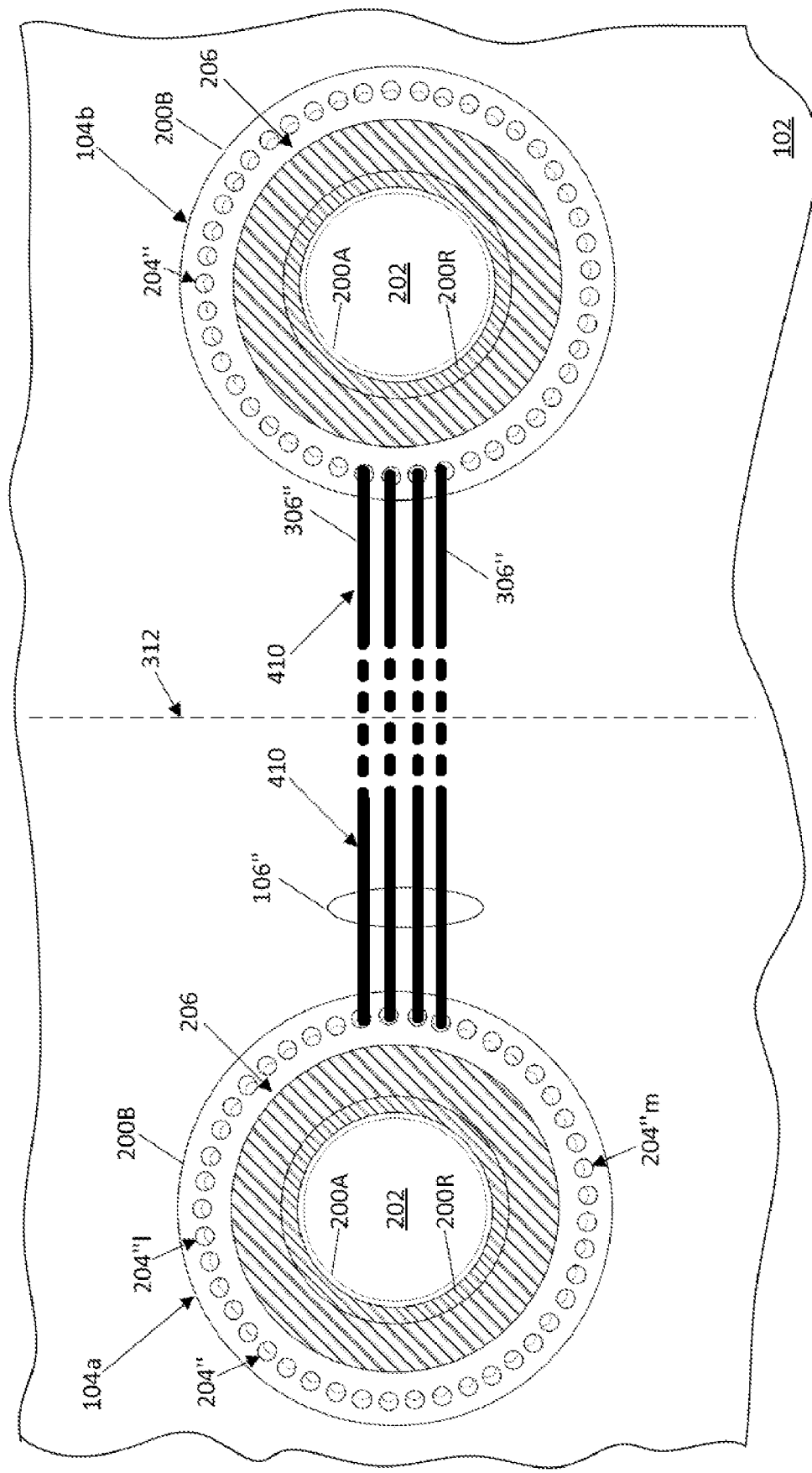
FIGS. 6A-6B illustrate top and angled views, respectively, of two fittings of the type illustrated in FIGS. 5A-5B and that are connected via an interconnect, according to certain embodiments.
Figure 6B:
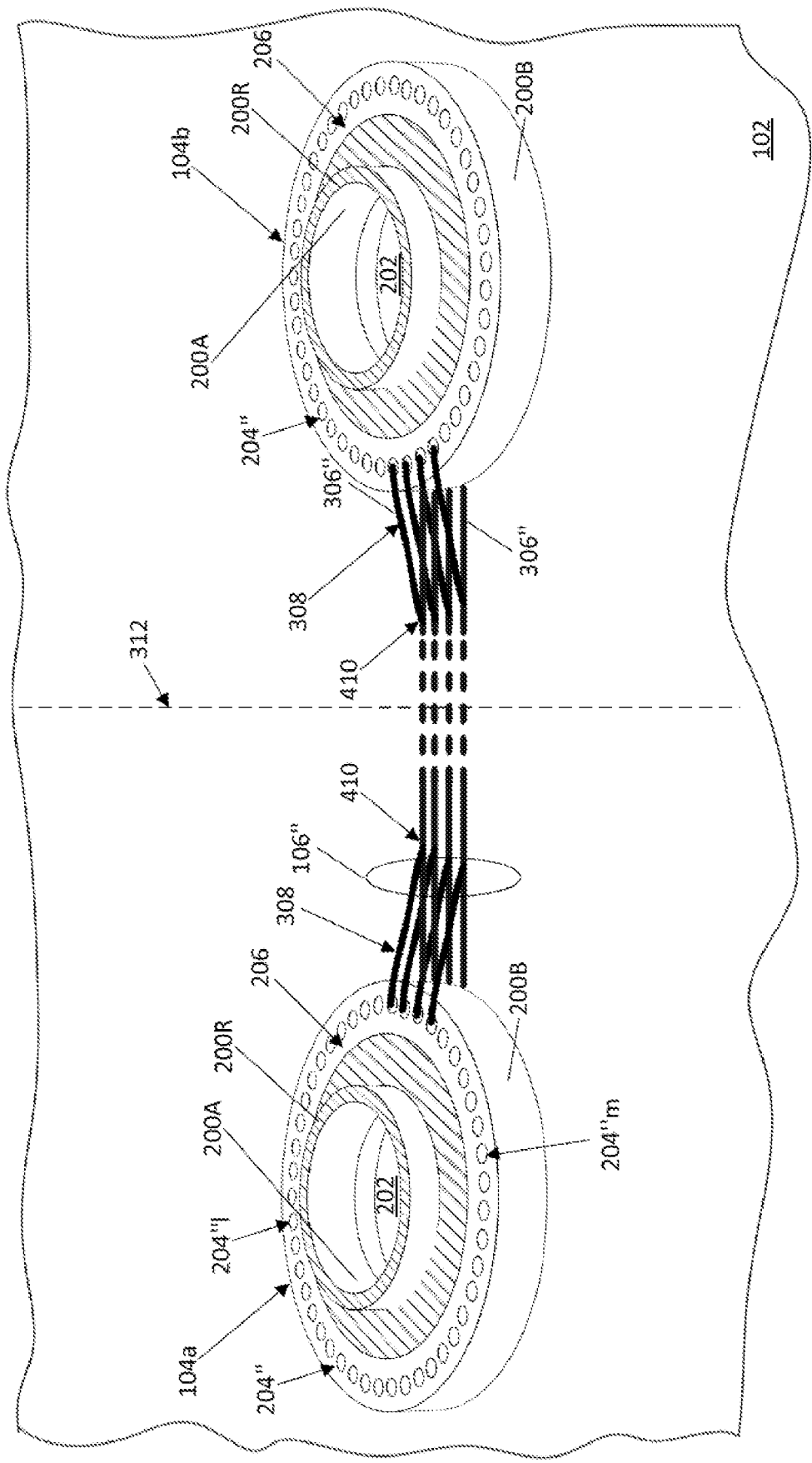
Figure 7:
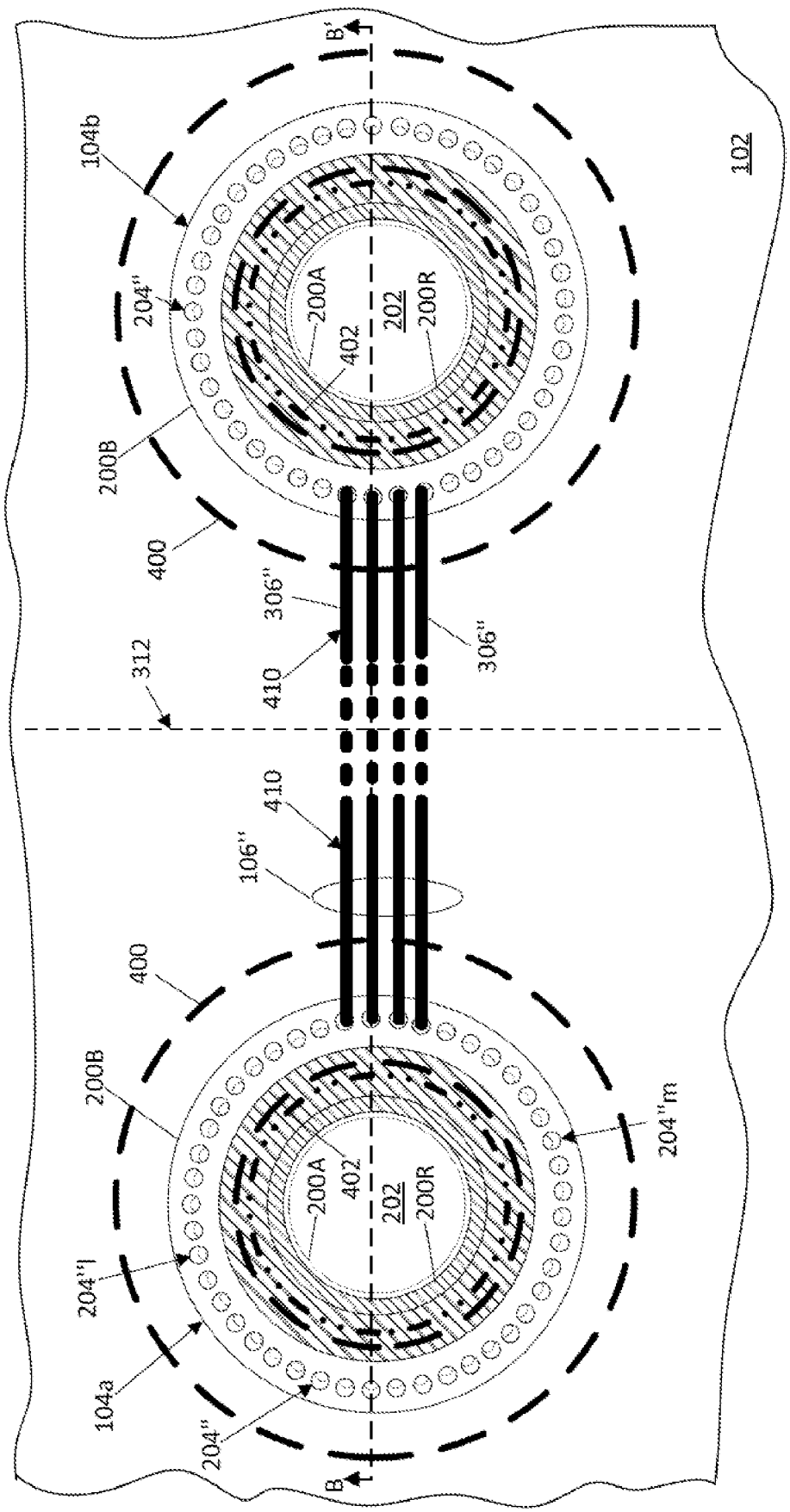
FIG. 7 illustrates a top view of a portion of fuel cell with attached fittings of FIGS. 6A-6B and one or more additional layers formed over an interconnect, according to certain embodiments.

As a first example, end portions of the interconnects 106 may be adhered to a primary portion of interconnects 106 (the portion of the interconnect 106 that spans the coupled fittings 104), examples of which are shown in FIGS. 3A-3B and 6A-6B, such that two distinct closed loops are formed for each connector of interconnect 106, one at each end of the connector for coupling to a fitting 104. As a second example, end portions of interconnects 106 may be adhered to each other such that interconnect 106 forms a continuous loop. As a third example, a buckle, ratchet, or other type of clip may be used to close the loop of interconnect 106, which may allow an amount of slack in interconnect 106 to be adjusted. Interconnects 106 may be adhered in any suitable manner, examples of which include stitching (an example of which is shown in FIGS. 3A-3B and 4), welding (an example of which is shown in FIGS. 6A-6B and 7), or tying.

The appropriate form of adherence may depend on the material of interconnects 106. For example, stitching may be appropriate for interconnects 106 made of certain types of webbing, such as seatbelt webbing. As another example, for interconnects 106 made of thermoplastic material, welding may be appropriate. As another example, ratchet/tie-down-type straps may be used, which may provide a built-in manner for adjust the tightness of interconnects 106, while still providing a relatively secure attachment that can withstand the types of forces that might be involved in a high impact event.

In certain embodiments, in addition to the strap/cordage/ or the like, interconnects 106 includes an intermediate fastener, such as a hook, carabiner, key ring, buckle, clip, or other element to connect to holes extending through outer portions of fittings 104. In other words, in such an embodiment, rather than the strap, cordage, or the like being threaded through holes extending through the outer portions of fittings 104, the strap, cordage, or the like may be attached to a fastener that attaches to the fitting 104 at a hole extending through the outer portions of the fitting 104.

Fuel cell 100, and particularly flexible body 102, is flexible so that it may deform without cracking in response to external stress and/or for other reasons. However, as described above, the area at which rigid fittings 104 are attached to flexible body 102 is a discontinuous transition in rigidity at the connecting point. This discontinuous transition presents a high risk of failure. As described above, a high impact event, such as a crash of the vehicle in which fuel cell 100 is contained, may cause flexible body 102 (and thereby fuel cell 100) to flatten, or pancake.

In certain embodiments, the use of interconnects 106 allows fittings 104 to share the load of stress (e.g., of a high impact event) introduced at or around areas where fittings 104 attach to flexible body 102. That is, interconnects 106 may provide structural support to flexibly body 102 of fuel cell 100, and allow dynamic loads to be shared across surface of flexible body 102. For example, fittings 104 located on sides 110 of fuel cell 100 that are less affected by the flattening (e.g., top side 110A and bottom side 110B) may be particularly helpful in sharing the load with fittings 104 on sides 110 of fuel cell 100 that are more affected by the flatting (e.g., a forward side 110C, an aft side 110D, a port side 110E, and a starboard side 110F).

Some or all of interconnects 106 may help reduce the pancaking of flexible body 102 that may occur as a result of the high impact event. Additionally or alternatively, some or all of interconnects 106 may help flexible body 102 recover more quickly from the pancaking (e.g., recover approximately the original shape of fuel cell 100 due to resilient properties of flexible body 102), which may reduce the time that areas at or around areas locations where fittings 104 attach to flexible body 102 are under stress, which may reduce or eliminate tearing and associated leaks forming at such areas. The formation of voids around the attachment of fittings 104 to flexible body 102 during deformation of flexible body 102 may thus be reduced or eliminated, reducing the risk of leaks from fuel cell 100.

In certain embodiments, very little, if any, slack is present in an interconnect 106 when flexible body 102 is at its full, non-collapsed shape. This property may optimize the ability of interconnect 106 to assist in reducing or preventing pancaking of flexible body 102 and/or expediting recovery of flexible body 102 during and/or following an impact event. Additionally, whether or not to pre-tension interconnects 106 may be determined according to the design of particular implementations. In certain embodiments, pre-tensioning interconnects 106 might cause flexible body 102 to fold in on itself as the amount of fuel in fuel cell 100 decreases, which might complicate making connections between fittings 104 and fuel lines or other inlet/outlet components. In certain embodiments, pre-tensioning interconnects 106 might reduce an amount of give (e.g., remaining ability to extend) that interconnects 106 are capable of achieving during an impact event. In certain embodiments, some level of slack may be desirable to provide flexible body 102 some room to move initially during an impact event, before interconnects 106 begin to bear and share the loads associated with an impact event. In one example, interconnects 106 connected fittings 104 initially with approximately zero tension and lay approximately tangentially against a surface of flexible body 102.

In certain embodiments, tension may be created in interconnects 106 when an impact event that causes flattening of flexible body 102 to occur, as interconnects 106 operate to transfer loads between coupled fittings 104. Interconnects 106 that are substantially parallel to a surface of impact (e.g., the ground) may act as a belt that helps to counteract flattening of flexible body 102. Interconnects 106 that are more vertically oriented (e.g., extending generally in the top-bottom direction, and potentially even substantially perpendicular to a surface of impact (e.g., the ground)) may help accelerate flexible body 102 regaining its shape after flattening. Of course, in certain embodiments, interconnects 106 in any direction may help with either or both of resisting flattening or accelerating recovery.

In certain embodiments, collectively optimizing one or more factors may improve and/or optimize the ability of interconnects (e.g., interconnects 106) to increase the crashworthiness of a fuel cell (e.g., fuel cell 100) that incorporates interconnects (e.g., interconnects 106). For example, decisions may be made regarding what materials to use for the interconnects, how many interconnects to use, which fittings to interconnect, and the like. These decisions may be based on factors that include the materials of the fuel cell body, the material of the fittings, the number of fittings, the material used for the interconnect, and a variety of other factors. These factors may be used as part of a model to determine where to put the interconnects, etc. Additional details are described below with reference to FIG. 10.

In certain embodiments, one or more interconnects 106 could incorporate conductive material. Including conductive material in interconnects 106 may allow interconnects 106 to improve electrostatic discharge performance, which may improve safety of a vehicle or other machine that incorporates a fuel cell (e.g., fuel cell 100) having interconnects (e.g., interconnects 106) that incorporate conductive material by reducing the possibility of a fire or explosion. Such interconnects 106 may act as a type of Faraday cage around fuel cell 100.

Figure 2A:
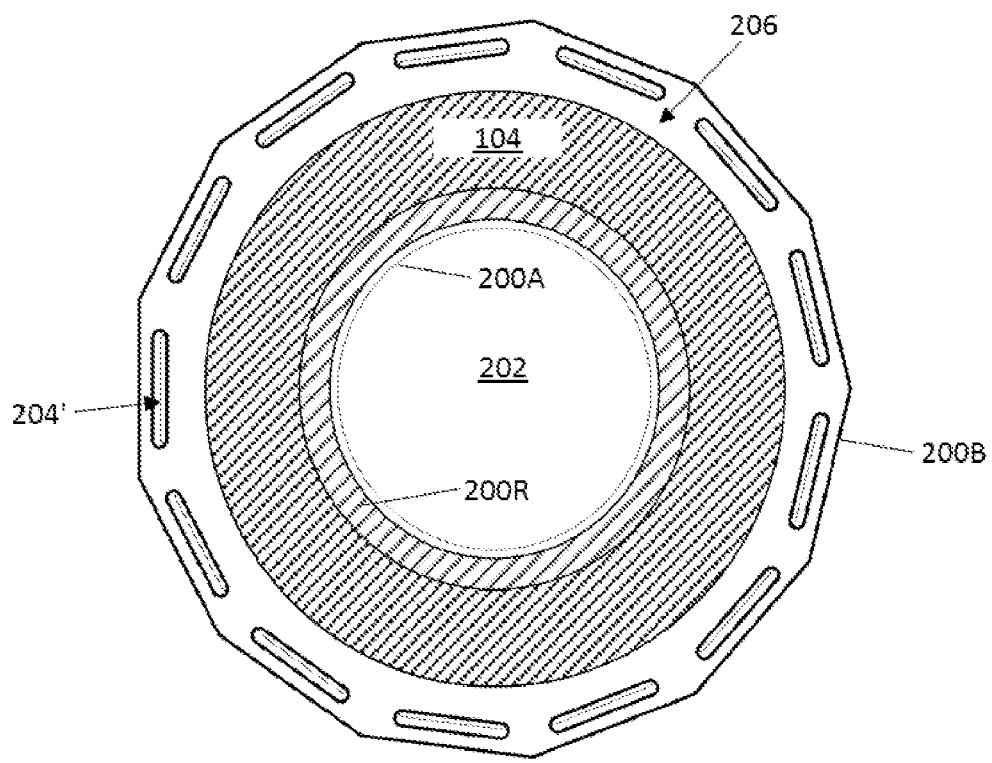
FIGS. 2A-2B illustrate detailed views of an example fitting for a fuel cell, according to certain embodiments.
Figure 2B:
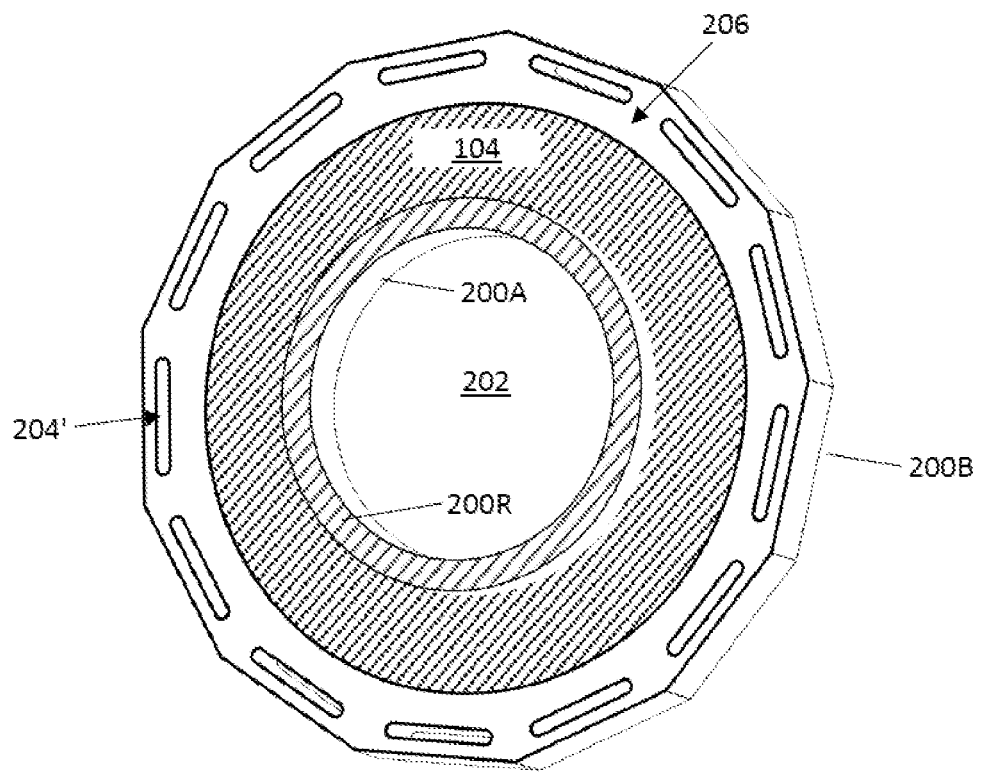

FIGS. 2A-2B illustrate detailed views of an example fitting 104 for a fuel cell (e.g., fuel cell 100), according to certain embodiments. As previously described, fitting 104 may have a ring shape. In the illustrated example, fitting 104 has a circular ring shape such that fitting 104 is an annulus. Fitting 104 is defined by an inner sidewall 200A and an outer sidewall 200B. Inner sidewall 200A is a sidewall of an inner portion of fitting 104, and outer sidewall 200B is a sidewall of an outer portion of fitting 104. Inner sidewall 200A defines a first opening 202, which extends through the center of fitting 104. During operation, fuel, or another fluid, flows through first opening 202 for ingress to and egress from a fuel cell (e.g., fuel cell 100 of FIGS. 1A-1B). Outer sidewall 200B defines the edge of fitting 104. In certain embodiments, fitting 104 is a single continuous rigid material which extends from inner sidewall 200A to outer sidewall 200B. In certain embodiments, the inner portion of fitting 104 includes a raised portion 200R, and inner sidewall 200A includes a sidewall of raised portion 200R. Raised portion 200R is raised from a top surface of fitting 104.

Multiple second openings 204 are disposed around first opening 202. Second openings 204 extend through fitting 104. Second openings 204 are in the outer portion of fitting 104, such that they are closer to outer sidewall 200B than to inner sidewall 200A. In the illustrated example, second openings 204 are shaped as elongated slots. Throughout the remainder of this disclosure, the slot-shaped second openings 204 illustrated in FIGS. 2A-2B (as well as in FIGS. 3A-3B and 4) may be referred to as slot-shaped second openings 204' or just second openings 204'. Thus, second openings may be referred to generically as second openings 204, and the particular example of slot-shaped second openings are referred to as slot-shaped second openings 204'. As described in greater detail below (see, for example, FIGS. 3A-3B and 4), interconnects 106 may be inserted through one or more slot-shaped second openings 204' such that the interconnects 106 are attached to fitting 104 via the slot-shaped second openings 204' and to connect the fitting 104 to another fitting 104 via the interconnect 106. Increasing the number of second openings 204' may increase the number of connection angles for connecting to other fittings 104; however, the number of second openings 204' that are possible may be limited by the width of interconnects 106 (e.g., the width of a connector of an interconnect 106) that might be inserted through a second opening 204'.

Optionally, a primer coating 206 is on the outer portions of fitting 104. Primer coating 206 may be on outer sidewall 200B of fitting 104, and may be on top and bottom surfaces of the outer portion of fitting 104. In certain embodiments, inner sidewall 200A of fitting 104 and the top and bottom surfaces of the inner portion of fitting 104 are free of primer coating 206. Primer coating 206 may be formed of a fuel-tolerant material such as polyvinylidene fluoride, nylon, urethane, or the like, which is capable of adhering to fitting 104. Any material which is substantially inert to fuel may be utilized for primer coating 206. In certain embodiments, primer coating 206 includes the same fuel-tolerant material as the outer layer of flexible body 102 of fuel cell 100 (see FIGS. 1A-1B).

As described below, the material of primer coating 206 may be capable of forming strong chemical bonds with an encapsulant (described below as encapsulant 400 in FIG. 4) that will be used subsequently to encapsulate the outer portion of fitting 104, thereby increasing adhesive strength of the encapsulant. For example, the adhesive strength of the encapsulant without primer coating 206 may be less than about 20 pounds per linear inch, and the adhesive strength of the encapsulant with primer coating 206 may be greater than about 100 pounds per linear inch. When the encapsulant is formed of a urethane-based resin, primer coating 206 may be formed of a material that is co-attachable to fitting 104 and the encapsulant. In certain embodiments, primer coating 206 may be omitted, which may reduce manufacturing costs.

FIGS. 3A-3B illustrate top and angled views, respectively, of two fittings 104a and 104b of the type illustrated in FIGS. 2A-2B and that are connected via an interconnect 106, according to certain embodiments. As described above with reference to fitting 104 of FIGS. 2A-2B, fittings 104a and 104b each may include second openings 204 that are shaped as elongated slots.

An interconnect 106', which is a particular example of an interconnect 106, is attached to fitting 104a and to fitting 104b, thereby coupling fittings 104a and 104b. In this example, interconnect 106' includes a single connector 306. Connector 306 is an elongated strap-shaped structure (e.g., a strap), which could be made, for example, of webbing such as seatbelt material. Connectors of an interconnect 106 may be referred to generically as connectors 306. A particular example of connectors 306 that are strap-shaped, as shown in FIGS. 3A-3B and 4 for example, may be referred to as strap-shaped connectors 306'.

In this example, interconnect 106' includes a single strap-shaped connector 306' (e.g., a single strap) attached to fitting 104a at a first slot-shaped second opening 204' of fitting 104a and attached to fitting 104b at a corresponding second slot-shaped second opening 204' of fitting 104b. In another example, interconnect 106' could include multiple connectors 306' (e.g., multiple straps) each attached to fitting 104a at respective first slot-shaped second openings 204' and attached to fitting 104b at corresponding respective second slot-shaped second openings 204'. In another example, one or more additional interconnects 106' (each including one or more connectors 306') are attached to fitting 104a that couple fitting 104a to one or more other fittings 104 other than fitting 104b. In a particular example, the one or more additional interconnects 106' could include an interconnect 106' that is attached to fitting 104a at a slot-shaped second opening 204'x and is also attached to fitting 104a at another slot-shaped second opening 204'y. Similarly, one or more additional interconnects 106' (each including one or more connectors 306') may be attached to fitting 104b to couple fitting 104b to one or more fittings 104 other than fitting 104b, including to fitting 104b.

Due to the slot shape, slot-shaped second openings 204' may be particularly configured for insertion of strap-shaped connectors 306' of interconnects 106'; however, slot-shaped second openings 204' may accommodate any suitable type of connector 306 that can be inserted through or otherwise attached to a slot-shaped second opening 204'.

As described above, interconnects 106' may connect to fittings 104 in any suitable manner. That is, each connector 306' of an interconnect 106' may connect to fittings 104a and 104b in any suitable manner. For example, connector 306' of interconnect 106' may be threaded or otherwise inserted through respective slot-shaped second openings 204' of fittings 104a and 104b such that portions of connectors 306' form loops 308 through the respective slot-shaped second openings 204'. End portions of interconnects 106' (e.g., of connector 306' of the interconnect 106') may be adhered to a primary portion of connector 306' (e.g., of connectors 306' of interconnect 106') (the portion of the interconnect 106' that spans fittings 104a and 104b). Additionally or alternatively, end portions of connectors 306' may be adhered to each other (e.g., such that connector 306' forms a continuous loop). Interconnects 106' (e.g., connectors 306') may be adhered in any suitable manner, examples of which include stitching (an example of which is shown in FIGS. 3A-3B and 4 as stitching 310), welding, or tying.

The appropriate form of adherence may depend on the material of interconnects 106' (e.g., of connectors 306'). For example, stitching may be appropriate for interconnects 106' made of certain types of webbing, such as seatbelt webbing. As another example, for interconnects 106' made of thermoplastic material, welding may be appropriate. As another example, ratchet/tie-down-type straps may be used such that a ratchet connector may be used, which may provide a built-in manner for adjust the tightness of interconnects 106' (e.g., of connectors 306' of interconnects 106'), while still providing a relatively secure attachment that can withstand the types of forces that might be involved in a high impact event. As another example, in addition to the strap/cordage/ or the like, interconnects 106' (e.g., connectors 306' of interconnects 106') may include a hook, carabiner, key ring, buckle, clip, or other element to connect to slot-shaped second openings 204' (or any other suitable type of second opening 204).

If interconnect 106' includes multiple connectors 306' that couple fitting 104a and 104b to each other, or potentially to other fittings 104, each connector 306' may be attached to the applicable fittings 104 in a similar or different manner, as may be appropriate for a given implementation.

Flexible body 102 is shown below interconnect 106'; however, flexible body 102 may be a multilayer structure, and in certain embodiments, at least a portion of interconnect 106' is sandwiched between at least two layers of the multilayer structure. Additionally, an edge (represented by the dashed line identified with the reference numeral 312 and which will be referred to as edge 312) of flexible body 102 is shown to be present between fittings 104a and 104b such that a path of interconnect 106' traverses edge 312. It will be understood, however, that fittings 104 that are connected by an interconnect 106 might or might not be separated by an edge of flexible body 102.

FIG. 4 illustrates a top view of a portion of fuel cell 100 with fitting 104a of FIGS. 3A-3B and one or more additional layers formed over interconnect 106', according to certain embodiments. In particular, FIG. 4 shows a portion of flexible body 102, fittings 104a and 104b, a portion of an interconnect 106' (e.g., a portion of connector 306') attached to fittings 104a and 104b, and an encapsulant 400 (shown in ghost for clarity of illustration).

In the illustrated example, for each fitting 104a and 104b, encapsulant 400 occupies the space between the pair of dashed circles. Encapsulant 400 encapsulates the outer portion of fitting 104a and at least a portion of interconnect 106' (e.g., each connector 306' of interconnect 106'). Encapsulant 400 may cover the outer portion of fitting 104a where the interconnect 106' (and particularly, the connectors 306' of interconnect 106') are strung through the slot-shaped second openings 204', and also covers at least a portion of primer coating 206. An inner portion of fitting 104a is not covered by encapsulant 400, so that a rigid surface of fitting 104a may be exposed for subsequent connection to a fuel line or other component. Encapsulant 400 also may cover some portions of flexible body 102. Further, encapsulant 400 may fill the remaining portions of the slot-shaped second openings 204' that are not filled by interconnect 106' (e.g., by a connector 306' of interconnect 106').

Encapsulant 400 may be formed of a fuel-tolerant material such as a polyurethane resin. The fuel-tolerant material of encapsulant 400 may be capable of forming strong chemical bonds with the fuel-tolerant material(s) of primer coating 206 and flexible body 102. The material of encapsulant 400 may be different from the material(s) of primer coating 206 and flexible body 102. The fuel-tolerant material of encapsulant 400 also may be capable of forming strong chemical bonds with the material(s) of interconnect 106'.

A cover layer 402 may be formed over exposed portions of flexible body 102 and over some or all of the exposed portions of fittings 104a and 104b, including potentially over encapsulant 400. In the illustrated example, for each fitting 104a and 104b, a boundary of cover layer 402 is marked by dash-dot-dot-dash circles. Cover layer 402 may radiate outward from those dash-dot-dot-dash circles, covering encapsulant 400 (and areas of fuel cell 100 covered by encapsulant 400), exposed portions of flexible body 102, and exposed portions of interconnects 106'. Cover layer 402 may be omitted from areas inside a circumference of the dash-dot-dot-dash circles. For example, cover layer 402 may be omitted from openings 202, so that openings 202 remain unobstructed. In certain embodiments, cover layer 402 is the outer layer of flexible body 102 that is described above with reference to FIGS. 1A-1B. For example, cover layer 402 may be formed of a puncture-resistant material such as a metal or metal alloy, or a strong synthetic fiber (e.g., KEVLAR). Any material which is substantially resistant to being pierced may be utilized for cover layer 402.

Figure 5A:
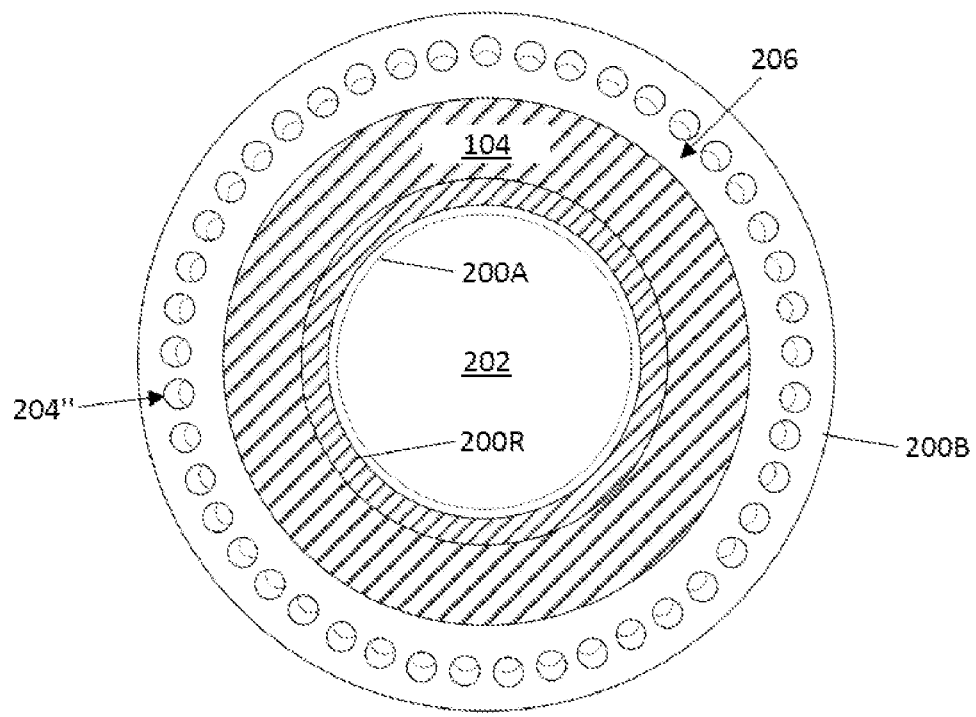
FIGS. 5A-5B illustrate detailed views of another example fitting for a fuel cell, according to certain embodiments.
Figure 5B:
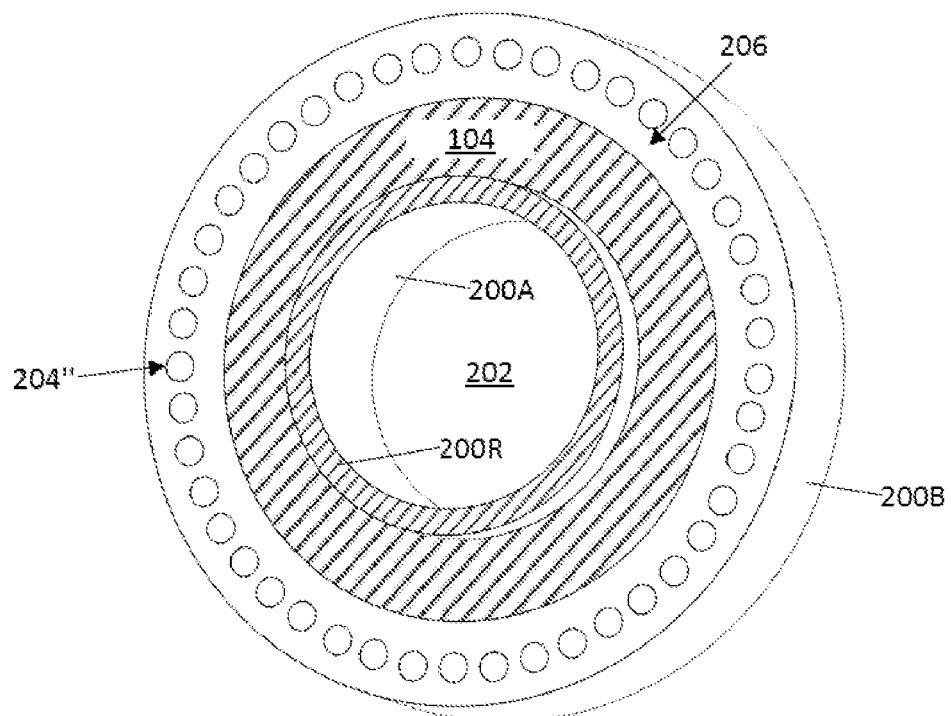

FIGS. 5A-5B illustrate detailed views of another example fitting 104 for a fuel cell (e.g., fuel cell 100), according to certain embodiments. The fitting 104 of FIGS. 5A-5B is substantially similar to the fitting 104 described above with reference to FIGS. 2A-2B. Differences, however, include the fitting 104 of FIGS. 5A-5B having a circular perimeter shape rather than a tridecagon perimeter shape, and the perimeter shape and quantity of second openings 204. Thus, other details of the fitting 104 of FIGS. 5A-5B are incorporated by reference from the description of FIGS. 2A-2B without being repeated.

In the illustrated example, second openings 204 are circular-shaped openings. Throughout the remainder of this disclosure, the circular-shaped second openings 204 illustrated in FIGS. 5A-5B (as well as in FIGS. 6A-6B and 7) may be referred to as circular-shaped second openings 204" or just second openings 204". Thus, second openings may be referred to generically as second openings 204, and the particular example of circular-shaped second openings are referred to as circular-shaped second openings 204". As described in greater detail below (see, e.g., FIGS. 6A-6B and 7), interconnects 106 may be inserted through one or more circular-shaped openings 204" such that the interconnects 106 are attached to fitting 104 via the circular-shaped second openings 204" and to couple the fitting 104 to another fitting 104 via the interconnect 106.

As described above with reference to the fitting 104 of FIGS. 2A-2B, the fitting 104 illustrated in FIGS. 5A-5B may include primer coating 206.

FIGS. 6A-6B illustrate top and angled views, respectively, of two fittings 104c and 104d of the type illustrated in FIGS. 5A-5B and that are connected via an interconnect 106, according to certain embodiments. As described above for fitting 104 of FIGS. 5A-5B, fittings 104c and 104d each may include circular-shaped second openings 204".

An interconnect 106", which is a particular example of an interconnect 106, is attached to fitting 104c and to fitting 104d, thereby coupling fittings 104c and 104d. In this example, interconnect 106" includes multiple connectors 306. Each connector 306 is an elongated cord-shaped structure (e.g., a cord), which could be made, for example, from any suitable type material including bungee cord material, plied yarn, rubber, or any other suitable natural or synthetic material or combination of materials. In an example of bungee cord material, for example, a connector 306 of an interconnect 106 may include a core of rubber or another resilient material and a shell surround the core and made from a braided material. Connectors of an interconnect 106 may be referred to generically as connectors 306. A particular example of connectors 306 that are cord-shaped, as shown in FIGS. 6A-6B and 7 for example, may be referred to as cord-shaped connectors 306".

In this example, interconnect 106" includes multiple elongated cord-shaped connectors 306" (e.g., multiple cords). Each cord-shaped connector 306" of interconnect 106" is attached to fitting 104c at a respective first circular-shaped second opening 204" of fitting 104c and attached to fitting 104d at a corresponding respective second circular-shaped opening 204" of fitting 104d. In another example, interconnect 106" could include a single connector 306" (e.g., a single cord) attached to fitting 104c at a first circular-shaped second opening 204" and attached to fitting 104d at a corresponding second circular-shaped second opening 204". Additionally or alternatively, depending on the diameter of second openings 204", in another example, interconnect 106" could include multiple connectors 306" (e.g., multiple cords) attached to fitting 104c at a first circular-shaped second opening 204" and attached to fitting 104d at a corresponding second circular-shaped second opening 204".

In another example, one or more additional interconnects 106" (each including one or more connectors 306") are attached to fitting 104c that couple fitting 104c to one or more other fittings 104 other than fitting 104d. In a particular example, the one or more additional interconnects 106" could include an interconnect 106" that is attached to fitting 104c at a circular-shaped second opening 204"l and is also attached to fitting 104c at another circular-shaped second opening 204"m. Similarly, one or more additional interconnects 106" (each including one or more connectors 306") may be attached to fitting 104d to couple fitting 104d to one or more fittings 104 other than fitting 104c, including to fitting 104d.

Due to the circular shape, circular-shaped second openings 204" may be particularly configured for insertion of cord-shaped connectors 306" of interconnects 106"; however, circular-shaped second openings 204" may accommodate any suitable type of connector 306 that can be inserted through or otherwise attached to a circular-shaped second opening 204".

As described above, interconnects 106" may connect to fittings 104 in any suitable manner. That is, each connector 306" of an interconnect 106" may connect to fittings 104c and 104d in any suitable manner. For example, a connector 306" of interconnect 106" may be threaded or otherwise inserted through respective circular-shaped second openings 204" of fittings 104c and 104d such that portions of connectors 306" form loops 308 through the respective circular-shaped second openings 204". End portions of an interconnect 106" (e.g., of connectors 306" of the interconnect 106") may be adhered to a primary portion of interconnect 106" (e.g., of connectors 306" of interconnect 106") (the portion of the interconnect 106" that spans fittings 104c and 104d). Additionally or alternatively, end portions of connectors 306" may be adhered to each other (e.g., such that connectors 306" form respective continuous loops). Interconnects 106" (e.g., connectors 306") may be adhered in any suitable manner, examples of which include stitching, welding (an example of which is shown in FIGS. 6A-6B and 7 as welding 410), or tying.

The appropriate form of adherence may depend on the material of interconnects 106" (e.g., of connectors 306"). For example, stitching may be appropriate for interconnects 106" made of certain types of webbing, such as seatbelt webbing. As another example, for interconnects 106" made of thermoplastic material, welding may be appropriate. As another example, ratchet/tie-down-type straps may be used such that a ratchet connector may be used, which may provide a built-in manner for adjust the tightness of interconnects 106" (e.g., of connectors 306"), while still providing a relatively secure attachment that can withstand the types of forces that might be involved in a high impact event. As another example, in addition to the strap/cordage/or the like, interconnects 106" (e.g., connectors 306") may include a hook, carabiner, key ring, buckle, clip, or other element to connect to circular-shaped second openings 204" (or any other suitable type of second opening 204).

If interconnect 106" includes multiple connectors 306" that couple fitting 104c and 104d to each other, or potentially to other fittings 104, each connector 306" may be attached to the applicable fittings 104 in a similar or different manner, as may be appropriate for a given implementation.

Flexible body 102 is shown below interconnect 106"; however, flexible body 102 may be a multilayer structure, and in certain embodiments, at least a portion of interconnect 106" is sandwiched between at least two layers of the multilayer structure. Additionally, an edge 312 of flexible body 102 is shown to be present between fittings 104c and 104d such that a path of interconnect 106" traverses edge 312. It will be understood, however, that fittings 104 that are connected by an interconnect 106 might or might not be separated by an edge of flexible body 102.

FIG. 7 illustrates a top view of a portion of fuel cell 100 with fitting 104c of FIGS. 6A-6B and one or more additional layers formed over interconnect 106", according to certain embodiments. In particular, FIG. 7 shows a portion of flexible body 102, fittings 104c and 104d, a portion of an interconnect 106" (e.g., a portion of multiple connectors 306") attached to fittings 104c and 104d, and an encapsulant 400 (shown in ghost for clarity of illustration).

In the illustrated example, for each fitting 104c and 104d, encapsulant 400 encapsulates occupies the space between the pair of dashed circles. Encapsulant 400 encapsulates the outer portion of fitting 104c and at least a portion of interconnect 106" (e.g., each connector 306" of interconnect 106"). Encapsulant 400 may cover the outer portion of fitting 104c where the interconnect 106" (and particularly, the connectors 306" of interconnect 106") are strung through the circular-shaped second openings 204", and also covers at least a portion of primer coating 206. An inner portion of fitting 104c is not covered by encapsulant 400, so that a rigid surface of fitting 104c may be exposed for subsequent connection to a fuel line or other component. Encapsulant 400 also may cover some portions of flexible body 102. Further, encapsulant 400 may fill the remaining portions of the circular-shaped second openings 204" that are not filled by interconnect 106" (e.g., by a connector 306" of interconnect 106"). Encapsulant 400 may be formed of a similar material to that described above with reference to FIG. 4.

Additionally, a cover layer 402 may be formed over exposed portions of flexible body 102 and over some or all of the exposed portions of fittings 104c and 104d, including potentially over encapsulant 400. In the illustrated example, for each fitting 104c and 104d, a boundary of cover layer 402 is marked by dash-dot-dot-dash circles. Cover layer 402 may radiate outward from those dash-dot-dot-dash circles, covering encapsulant 400 (and areas of fuel cell 100 covered by encapsulant 400), exposed portions of flexible body 102, and exposed portions of interconnects 106". Additional details of a cover layer 402 are described above with reference to FIG. 4 and are incorporated by reference.

FIGS. 8A-8G illustrate a cross-sectional view of a portion of fuel cell 100 during a process for forming fuel cell 100, according to certain embodiments. In the illustrated example, FIGS. 8A-8G illustrate attaching two fittings 104e and 104f to flexible body 102 and coupling fittings 104a and 104f together using an interconnect 106''' (e.g., a connector 306''' of interconnect 106''').

For example, fittings 104e and 104f could be similar or identical to fittings 104a and 104b, respectively. In such an example, FIGS. 8A-8G may be cross-sectional views of a portion of a fuel cell 100 along a similar cross-section as cross-section A-A' in FIG. 4 (with fittings 104a and 104b having slot-shaped second openings 204'), and show in part the attachment of interconnect 106' (and particularly a connector 306' of an interconnect 106').

As another example, fittings 104e and 104f could be similar or identical to fittings 104c and 104d, respectively. In such an example, FIGS. 8A-8G may be cross-sectional views of a portion of a fuel cell 100 along a similar cross-section as cross-section B-B' in FIG. 7 (with fittings 104c and 104d having slot-shaped second openings 204"), and show in part the attachment of interconnect 106" (and particularly a connector 306" of an interconnect 106").

As another example, fittings 104e and 104f could be other types of fittings 104 that are capable of being attached using an interconnect 106/connector(s) 306. Furthermore, regardless of the type of fitting 104 used, this disclosure contemplates using any suitable type of interconnect 106 having any suitable type of one or more connectors 306.

The coupling of two fittings 104e and 104f to each other using interconnect 106''' is illustrated and described. Additionally or alternatively, a single fitting 104 having a single interconnect 106 that wraps around flexible body 102 and is attached to opposing sides of the single fitting 104 may be used, or more than two fittings 104 may be attached to a flexible body 102 and coupled to one another using interconnects 106 in any of a variety of configurations.

Figure 8A:
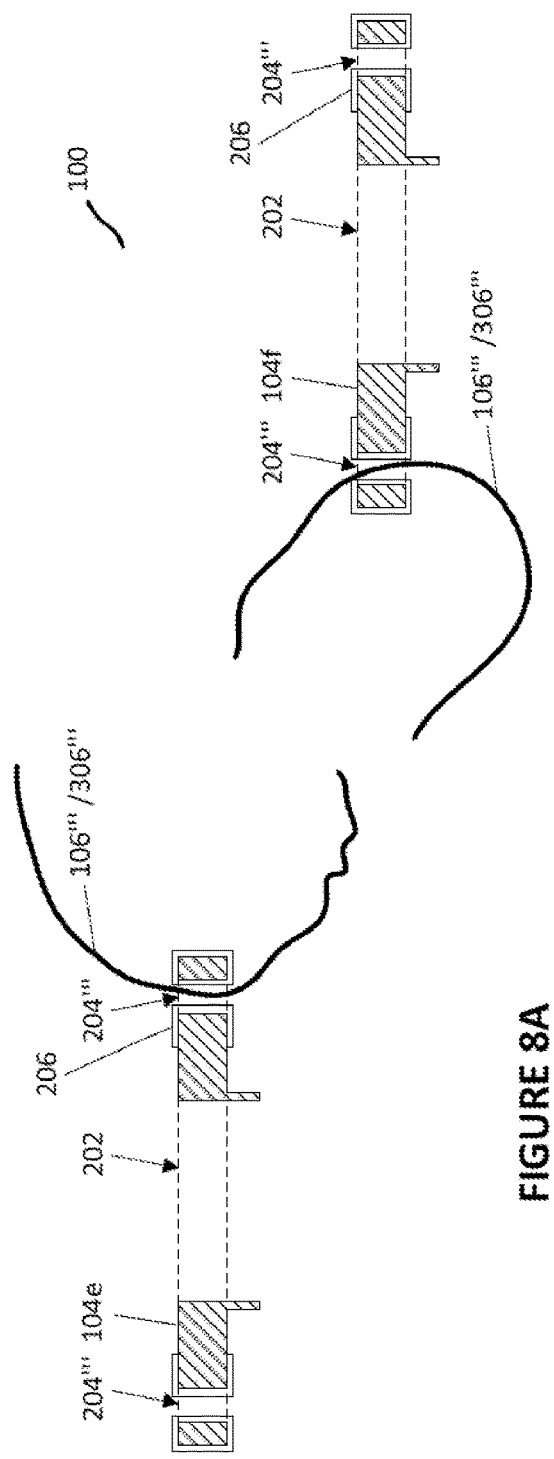
FIGS. 8A-8G illustrate cross-sectional view of a portion of a fuel cell during a process for forming the fuel cell, according to certain embodiments.

As shown in FIG. 8A, fittings 104e and 104f are received or formed. Fittings 104e and 104f may be formed by milling a metal or composite material, for example. The milling may be controlled using a computer numerical control (CNC) process. In embodiments in which primer coating 206 is on fittings 104e and 104f, primer coating 206 may be formed by treating the outer portions of fittings 104e and 104f with a polymeric plasma coating process.

Additionally, as shown in FIG. 8A, respective connectors 306''' of interconnect 106''' may be threaded or otherwise inserted through a second openings 204''' of fittings 104e and 104f respectively. Each connector 306''' of interconnect 106''' may be connected to fittings 104e and 104f. For example, a connector 306''' of interconnect 106''' may be threaded or otherwise inserted through a slot-shaped second opening 204''' of fitting 104e and a corresponding connector 306''' of interconnect 106''' may be threaded or otherwise inserted through a corresponding slot-shaped second opening 204''' of fitting 104f such that portions of the connectors 306''' form loops 308 through the respective slot-shaped second openings 204'''.

A connector 306''' threaded through a second opening 204''' of fitting 104e is to be later connected to a corresponding connector 306''' threaded through a corresponding opening 204''' of fitting 104f to form a unified connector 306''' (and to form a portion or all of the interconnect 106''' between fittings 104e and 104f). If interconnect 106''' includes multiple connectors 306''' for fittings 104e and 104f, multiple connectors 306''' may be threaded or otherwise inserted through respective second openings 204''' of fitting 104e and multiple connectors 306''' may be threaded or otherwise inserted through respective second openings 204''' of fitting 104f. Furthermore, to the extent either of fittings 104e or 104f are to include interconnects 106 to other fittings 104, connector(s) 306 associated with those other interconnects also may be inserted through suitable second openings 204 at this time. Connectors 306''' may be longer than expected at this point to provide a margin of error.

Thus, in this example, connectors 306''' are coupled to respective fittings 104 as part of a subassembly process prior to attaching fittings 104 to flexible body 102 (or a portion thereof).

Figure 8B:
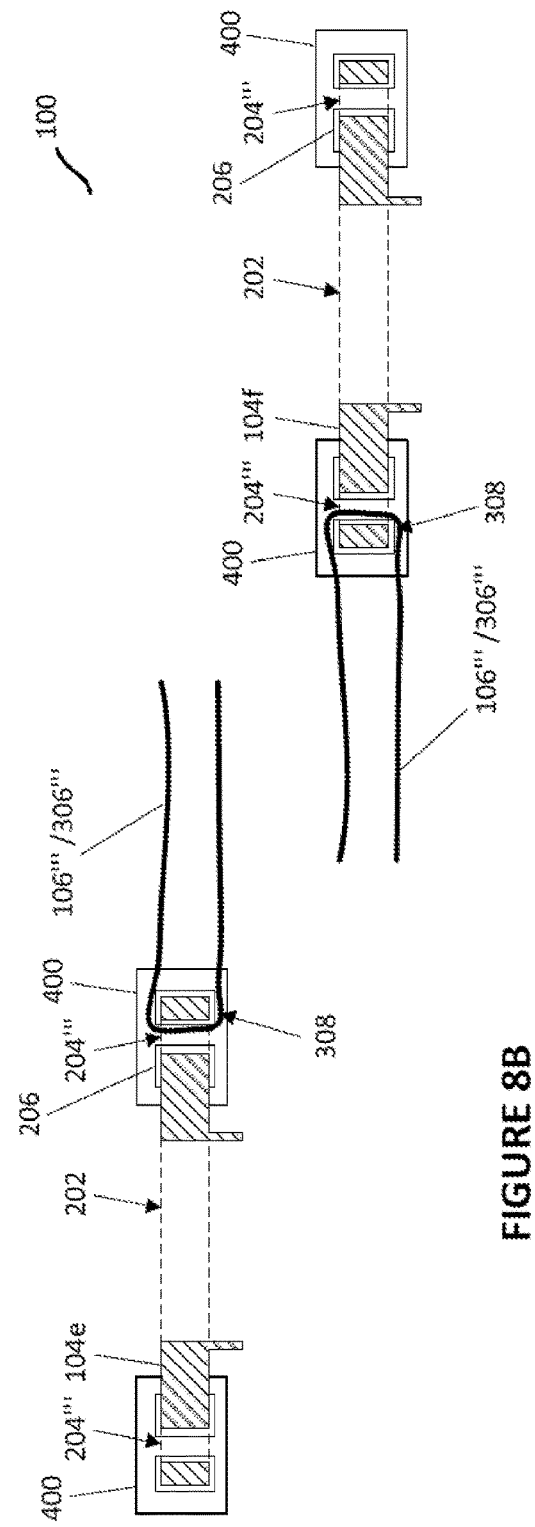

As shown in FIG. 8B, encapsulant 400 is formed over and among interconnect(s) 106''' (connector(s) 306''') and fittings 104e/104f at and around a perimeter of fittings 104e/104f, generally covering second openings 204'''. For example, encapsulant 400 may be formed around the outer portion of fittings 104e/104f and at least a portion of each connector 306''' of each interconnect 106'''. Encapsulant 400 also may be formed on at least a portion of primer coating 206. Encapsulant 400 may be omitted from openings 202 so that those openings remain unobstructed. In general, encapsulant 400 holds interconnects 106'''/connector(s) 306''' in position in openings 204''' and may also seal openings 204'''.

Encapsulant 400 may be formed by compression molding, injection molding, or the like. In certain embodiments, the mold is an aluminum mold, and the molding process is performed at a vacuum, which can help avoid the formation of voids in encapsulant 400, such as voids in the second openings 204''' or voids around interconnects 106'''/connectors 306'''. In the illustrated example, encapsulant 400 covers all of primer coating 206. In another example, encapsulant 400 covers a portion of primer coating 206.

In certain embodiments where the materials of interconnects 106'''/connectors 306''' have a low melting point, the molding process for encapsulant 400 is a cold chemistry process. For example, encapsulant 400 may be a polyurethane resin formulated from isocyanate and polyol. The isocyanate may be methylene diphenyl diisocyanate and the polyol may be a polyether. The molding process for encapsulant 400 may be performed at a temperature which is lower than the melting point of the material of interconnects 106'''/connectors 306'''. In certain embodiments, the molding process is performed at a temperature in the range of 20° C. to 100° C. A curing process (e.g., vulcanization process) for encapsulant 400 may thus be omitted from the molding process, decreasing processing time.

During formation, the material of encapsulant 400 may form strong chemical bonds (such as covalent bonds) with the material(s) of primer coating 206. Thus, the fuel-tolerant material of encapsulant 400 is chemically bonded to the fuel-tolerant material of primer coating 206.

Figure 8C:
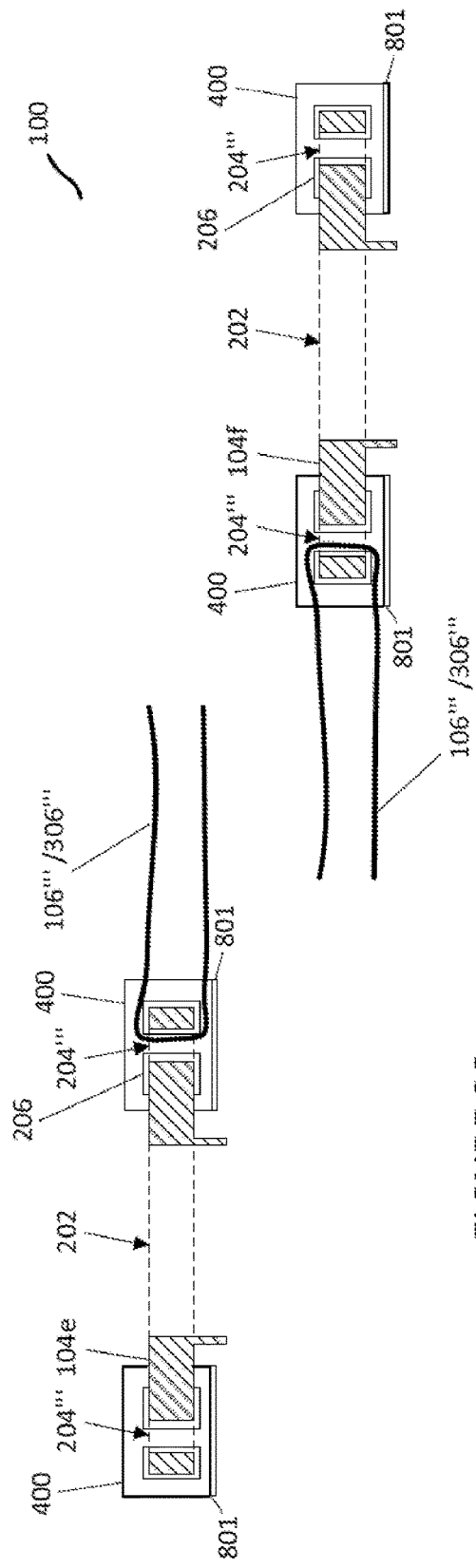

As shown in FIG. 8C, an adhesive 801 may be applied to a bottom surface of encapsulant 400 of fittings 104e and 104f for subsequently adhering fittings 104e and 104f to flexible body 102 or a layer thereof (e.g., to substrate 802, described below) when attaching fittings 104e and 104f to flexible body 102 or the layer thereof. In certain embodiments, adhesive 801 may be applied to the bottom surface of encapsulant 400 once the material of encapsulant 400 has set. Adhesive 801 may be any suitable type of adhesive. In certain embodiments, for chemical compatibility, a same material (e.g., a same resin) may be used for both the infusion process of FIG. 8B and as adhesive 801.

Figure 8D:
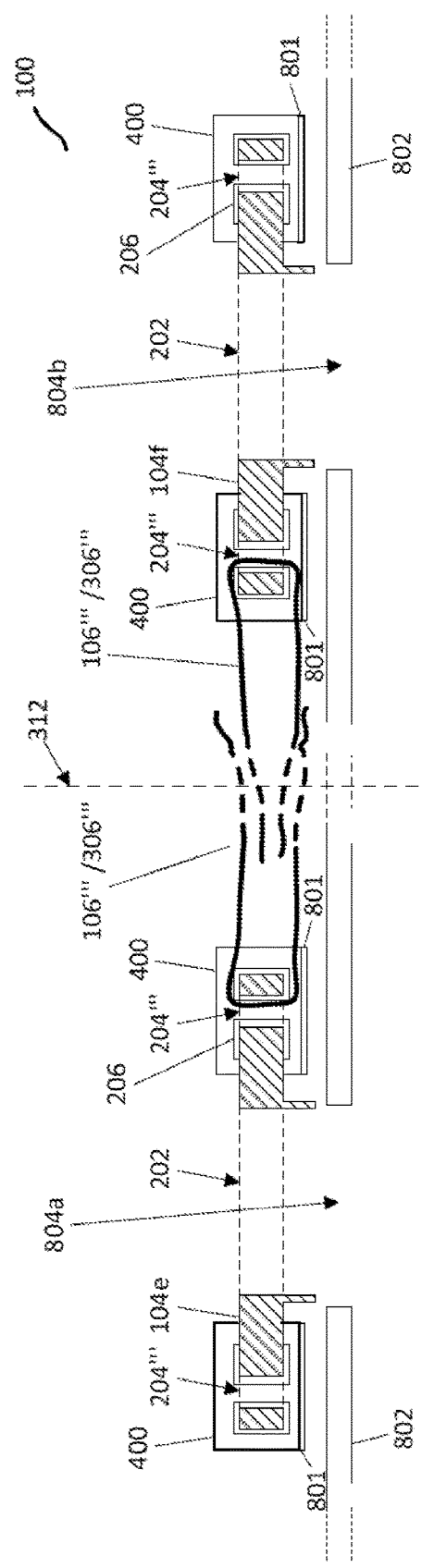

As shown in FIG. 8D, substrate 802 for a fuel cell 100 is received or formed. Substrate 802 may be a portion (e.g., one or more layers) that are to make up flexible body 102, with an additional one or more layers to be formed subsequently. Alternatively, substrate 802 may be the entire flexible body 102. In certain embodiments, substrate 802 may be formed of a fuel-tolerant material such as polyvinylidene fluoride, nylon, urethane, or the like. For example, any material which is substantially inert to fuel may be utilized for substrate in the context of a fuel cell implementation. Substrate 802 may be formed over a mold or other suitable structure that facilitates forming flexible body 102 into the target shape for fuel cell 100. In certain embodiments, the mold is formed of a material that can later be dissolved, disintegrated, melted, evaporated, or the like.

Openings 804a and 804b may be formed in substrate 802. Openings also may be referred to generically as openings 804. Openings 804 may be formed in substrate 802 in any suitable manner. Openings 804 may be formed in substrate 802 prior to or after attaching fittings 104 to substrate 802, depending on the configuration of fittings 104. Openings 804 may be formed by cutting substrate 802 using fittings 104e and 104f as a stencil. Additionally or alternatively, substrate 802 may be received having openings 804 precut into substrate 802. Openings 804a and 804b may correspond to locations where fittings 104e and 104f, respectively, are to be attached to substrate 802. Locations of openings 804 may be determined in any suitable manner. In certain embodiments, locations of openings 804 are determined according to the configuration or specifications of a vehicle or other machine in which fuel cell 100 will be positioned for use. Although two openings 804 are shown, substrate 802 may include any suitable number of openings 804.

In the illustrated example, an edge 312 of substrate 802 (and ultimately of flexible body 102) is located between openings 804a and 804b. Although a single edge 312 is represented, substrate 802 may include multiple edges between openings 804a and 804b. For example, opening 804a could be in substrate 802 at what will be a top surface of flexible body 102 and opening 804b could be in substrate 802 at what will be a bottom surface of flexible body 102, such that two edges 312 are present between openings 804a and 804b (e.g., an edge 312 between the top surface and a side surface and an edge 312 between the side surface and the bottom surface).

Additionally, as shown in FIG. 8D, fittings 104e and 104f, with their respective connector(s) 306''' attached (e.g., via the encapsulation process described above with reference to FIG. 8B or via another technique) are moved into position (e.g., over openings 804a and 804b, respectively) for attachment to substrate 802.

Figure 8E:
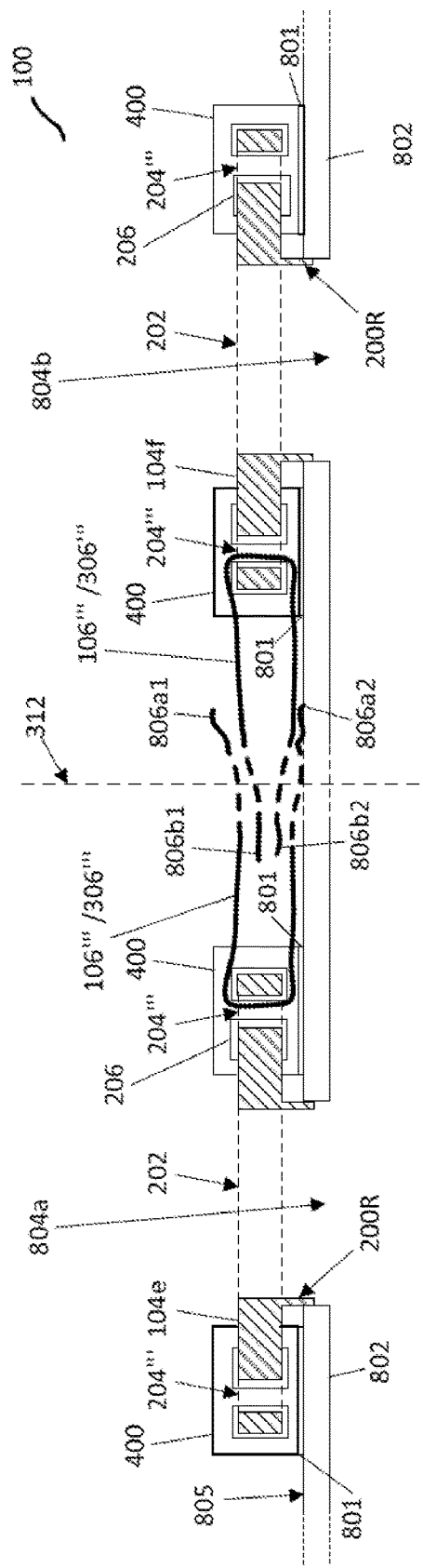

As shown in FIG. 8E, fittings 104e and 104f, with their respective connector(s) 306''' attached (e.g., via the encapsulation process described above with reference to FIG. 8B or via another technique), are attached to substrate 802 at respective openings 804 in substrate 802. For example, fitting 104e may be attached to substrate 802 at opening 804a and fitting 104f may be attached to substrate 802 at opening 804b.

Fittings 104e and 104f may be attached to substrate 802 in any suitable manner. Example attachment techniques include bolt/washer combinations (e.g., an exposed plate, gasket, and nut-ring flange combination), stitching with a yarn-type material, adhesives, patch attachment structures, or any other suitable attachment technique. In certain embodiments, attaching fitting 104e/104f to substrate 802 includes placing fitting 104e/104f on substrate 802 so that the raised portion 200R of fitting 104e/104f extends through opening 804a/804b, and then attaching the outer portion of fitting 104e/104f to flexible body 102 with bolts/washers, yarns, adhesives, or other attachment structures.

In certain embodiments, fittings 104e and 104f may be attached to a surface 805 of substrate 802 using adhesive 801 applied to bottom surfaces of encapsulant 400. Surface 805 may be an exterior surface of flexible body 102, at least at this point during the assembly process (e.g., one or more additional layers may be deposited over surface 805 of substrate 802 at a later stage to form additional layers of flexible body 102).

In certain embodiments, the material of adhesive 801 may form strong chemical bonds (such as covalent bonds) with the material(s) of encapsulant and substrate 802. Thus, the fuel-tolerant material of adhesive 801 is chemically bonded to the fuel-tolerant material of encapsulant 400 and the fuel-tolerant material of substrate 802, thereby adhering a fitting 104 to surface 805 of substrate 802.

At this point, in the illustrated example, four end portions 806 of connectors 306'''/interconnect 106''' attached to fittings 104e and 104f (end portions 806a1 and 806a2 for the connector 306'''/interconnect 106''' attached to fitting 104e and end portions 806b1 and 806b2 for the connector 306'''/interconnect 106''' attached to fitting 104f) remain loose/unattached.

Figure 8F:
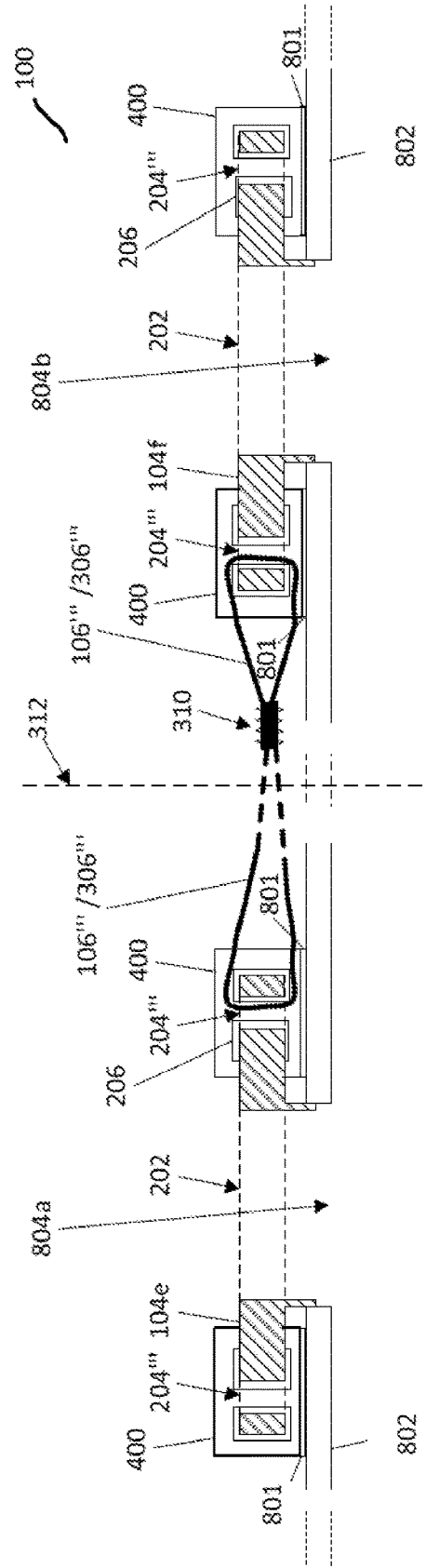

As shown in FIG. 8F, a connector 306''' attached to fitting 104e is coupled to a corresponding connector 306''' that is attached to fitting 104f to form interconnect 106''', or a portion of interconnect 106''' if interconnect 106''' between fitting 104e and 104f includes multiple connectors 306'''. This disclosure contemplates coupling connectors 306''' together in any suitable manner. Once coupled, the connector 306''' attached to fitting 104e and the connector 306''' attached to fitting 104f may be considered a single connector 306''' having one or more loops, depending on the technique for coupling the connectors 306'''.

In the illustrated example, end portions 806a1 and 806a2 of the connector 306''' attached to fitting 104e and end portions 806b1 and 806b2 of the connector 306''' attached to fitting 104f are coupled together to form interconnect 106''', or a portion of interconnect 106''' if interconnect 106''' between fitting 104e and 104f includes multiple connectors 306'''. In such an example, connector 306''' includes two loops, one to each side of the connection point of end portions 806a1, 806a2, 806b1, and 806b2.

As another example, end portion 806a1 of the connector 306''' attached to fitting 104e may be coupled to corresponding end portion 806b1 of the connector 306''' attached to fitting 104f, and end portion 806a2 of the connector 306''' attached to fitting 104e may be coupled to corresponding end portion 806b2 of the connector 306''' attached to fitting 104f to form interconnect 106''', or a portion of interconnect 106''' if interconnect 106''' between fitting 104e and 104f includes multiple connectors 306'''. In such an example, connector 306''' forms a continuous loop.

Additionally, this disclosure contemplates coupling less than all four of the end portions 806 of connectors 306'" (e.g., only coupling end portion 806a1 of the connector 306'" attached to fitting 104e to corresponding end portion 806b1 of the connector 306'" attached to fitting 104f, or only coupling end portion 806a2 of the connector 306'" attached to fitting 104e to corresponding end portion 806b2 of the connector 306'" attached to fitting 104f.

To the extent appropriate, connectors 306'" may be trimmed prior to or after coupling to remove excess material. It will be appreciated that what constitutes an end portion 806 of a connector 306 may be relocated relative to what is shown in FIG. 8E if a connector is trimmed.

In examples in which interconnect 106'" includes multiple connectors 306'" attached to fitting 104e and multiple connectors 306'" attached to fitting 104f, the connectors 306'" attached to fitting 104e may each be connected to a single corresponding connector 306'" attached to fitting 104f, or the connectors 306'" attached to fitting 104e may be connected to connectors 306'" attached to fitting 104f in one or more groups.

Interconnects 106'" (e.g., connector 306'") may be adhered or otherwise coupled in any suitable manner, examples of which include stitching 310 (see, e.g., FIGS. 3A-3B, 4, and 8F), welding 410 (see, e.g., FIGS. 6A-6B and 7), clipping (e.g., using a buckle, ratchet, or other type of clip), tying, or another suitable mechanism.

As an example, connectors 306'" may be stitched together using an embroidering machine such as a JGW-0100-650 Technical Embroidering Machine from ZSK. The stitching may be controlled using a CNC process, which determines the placement of stitching 310. Utilizing a CNC process may improve the accuracy and repeatability of the stitching, especially when compared to manual stitching. Manufacturing yield may thus be improved. The CNC process may be one which is capable of controlling the stitching (e.g., needle movement) in three directions (e.g., X-axis, Y-axis, and Z-axis). The stitching may be performed by programming the CNC process for the embroidering machine, and then performing the stitching with the embroidering machine controlled using the CNC process. The CNC process programming may be performed using, e.g., EPCWin from ZSK. Achieving a desired density and strength of stitching 310 may be easier with a CNC process than manual stitching, as CNC processes are less prone to error than manual stitching. As such, the stitching may be performed with a smaller margin of error. Additionally or alternatively, stitching may be performed manually.

Figure 8G:
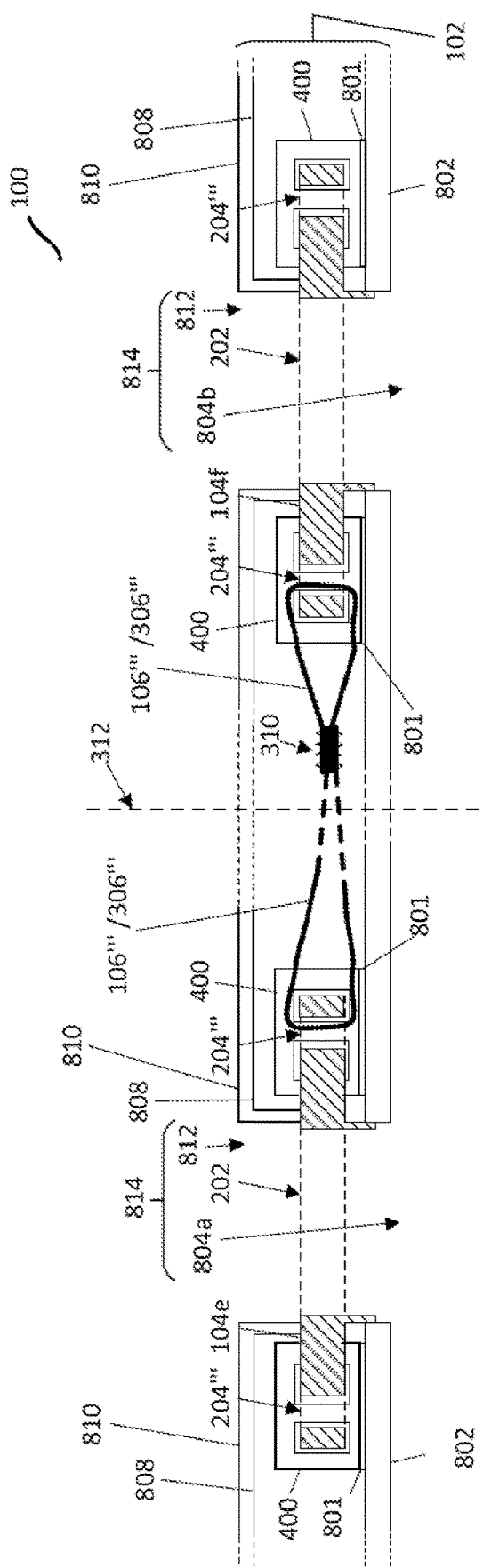

As shown in FIG. 8G, additional material layers are deposited over substrate 802. For example, a middle layer 808 may be deposited over substrate 802, and an outer layer 810 may be deposited over middle layer 808. Collectively, substrate 802, middle layer 808, and outer layer 810 may form flexible body 102 of fuel cell 100. When flexible body 102 is formed of layers of composite materials, the various layers may be laminated on each other.

Middle layer 808 may be formed of a seal-sealing and/or self-healing gel or other material, such as an elastomeric gel. In certain embodiments, any material that is capable of expanding to self-seal and/or self-seal holes (e.g., ballistically formed holes) in flexible body 102 may be used for middle layer 808. Outer layer 810 may be formed of a puncture-resistant material such as a metal or metal alloy, a strong synthetic fiber (e.g., KEVLAR) or another suitable textile material, or the like. In certain embodiments, any material that is substantially resistant to being pierced may be used for outer layer 810. Although these example layers are described, flexible body 102 may include any suitable number and types of layers.

In the illustrated example, interconnects 106/connectors 306 are sandwiched between/within the layers that make up flexible body 102. In another embodiment, interconnects 106'"/connectors 306'" may be located outside the layers of flexible body 102 (e.g., outside outer layer 810).

Openings 812 extend through encapsulant 400, middle layer 808, and outer layer 810. Openings 812 expose the inner portion of fittings 104e and 104f, and are aligned with openings 202, 804a/804b of fittings 104e and 104f. The openings 202, 804a/804b, and 812 collectively define openings 814. Openings 814 extend through fittings 104e/104f and the layers of flexible body 102. As such, openings 814 define inlets/outlets for fuel cell 100. A rigid fuel line or other apparatus may extend through each opening 814.

As described previously, fuel cell 100 may have any desired quantity of fittings 104. Some or all of the fittings 104 may be coupled together using interconnects 106 in a manner similar to that described with reference to FIGS. 8A-8G. Fittings 104 other than those like fittings 104a and 104b may be used in place of or in addition to fittings 104 like fittings 104a and 104b.

FIGS. 9A-9G illustrate a cross-sectional view of a portion of fuel cell 100 during a process for forming fuel cell 100, according to certain embodiments. In the illustrated example, FIGS. 9A-9G illustrate attaching two fittings 104e and 104f to flexible body 102 and coupling fittings 104a and 104f together using an interconnect 106'" (e.g., a connector 306'" of interconnect 106'").

For example, fittings 104e and 104f could be similar or identical to fittings 104a and 104b, respectively. In such an example, FIGS. 9A-9G may be cross-sectional views of a portion of a fuel cell 100 along a similar cross-section as cross-section A-A' in FIG. 4 (with fittings 104a and 104b having slot-shaped second openings 204'), and show in part the attachment of interconnect 106' (and particularly a connector 306' of an interconnect 106').

As another example, fittings 104e and 104f could be similar or identical to fittings 104c and 104d, respectively. In such an example, FIGS. 9A-9G may be cross-sectional views of a portion of a fuel cell 100 along a similar cross-section as cross-section B-B' in FIG. 7 (with fittings 104c and 104d having slot-shaped second openings 204"), and show in part the attachment of interconnect 106" (and particularly a connector 306" of an interconnect 106").

As another example, fittings 104e and 104f could be other types of fittings 104 that are capable of being attached using an interconnect 106/connector(s) 306. Furthermore, regardless of the type of fitting 104 used, this disclosure contemplates using any suitable type of interconnect 106 having any suitable type of one or more connectors 306.

The coupling of two fittings 104e and 104f to each other using interconnect 106'" is illustrated and described. Additionally or alternatively, a single fitting 104 having a single interconnect 106 that wraps around flexible body 102 and is attached to opposing sides of the single fitting 104 may be used, or more than two fittings 104 may be attached to a flexible body 102 and coupled to one another using interconnects 106 in any of a variety of configurations.

Figure 9A:
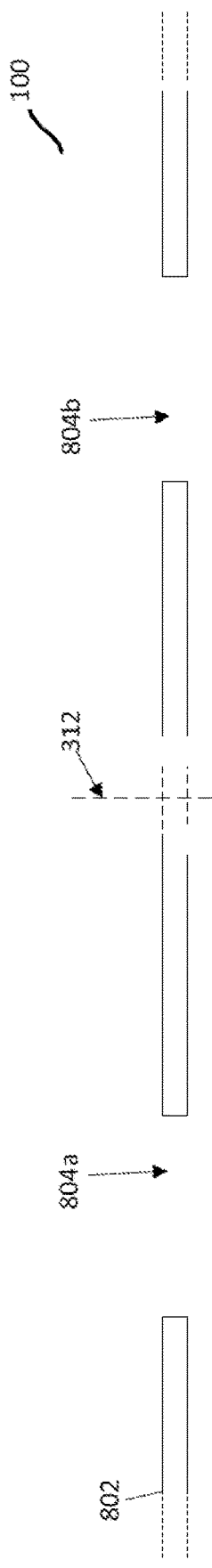

As shown in FIG. 9A, substrate 802 for a fuel cell 100 is received or formed. Substrate 802 may be a portion (e.g., one or more layers) that are to make up flexible body 102, with an additional one or more layers to be formed subsequently. Alternatively, substrate 802 may be the entire flexible body 102. In certain embodiments, substrate 802 may be formed of a fuel-tolerant material such as polyvinylidene fluoride, nylon, urethane, or the like. For example, any material which is substantially inert to fuel may be utilized for substrate in the context of a fuel cell implementation. Substrate 802 may be formed over a mold or other suitable structure that facilitates forming flexible body 102 into the target shape for fuel cell 100. In certain embodiments, the mold is formed of a material that can later be dissolved, disintegrated, melted, evaporated, or the like.

Openings 804a and 804b may be formed in substrate 802. Openings also may be referred to generically as openings 804. Openings 804 may be formed in substrate 802 in any suitable manner. Openings 804 may be formed in substrate 802 prior to or after attaching fittings 104 to substrate 802, depending on the configuration of fittings 104. Openings 804 may be formed by cutting substrate 802 using fittings 104e and 104f as a stencil. Additionally or alternatively, substrate 802 may be received having openings 804 precut into substrate 802. Openings 804a and 804b may correspond to locations where fittings 104e and 104f, respectively, are to be attached to substrate 802. Locations of openings 804 may be determined in any suitable manner. In certain embodiments, locations of openings 804 are determined according to the configuration or specifications of a vehicle or other machine in which fuel cell 100 will be positioned for use. Although two openings 804 are shown, substrate 802 may include any suitable number of openings 804.

In the illustrated example, an edge 312 of substrate 802 (and ultimately of flexible body 102) is located between openings 804a and 804b. Although a single edge 312 is represented, substrate 802 may include multiple edges between openings 804a and 804b. For example, opening 804a could be in substrate 802 at what will be a top surface of flexible body 102 and opening 804b could be in substrate 802 at what will be a bottom surface of flexible body 102, such that two edges 312 are present between openings 804a and 804b (e.g., an edge 312 between the top surface and a side surface and an edge 312 between the side surface and the bottom surface).

Figure 9B:
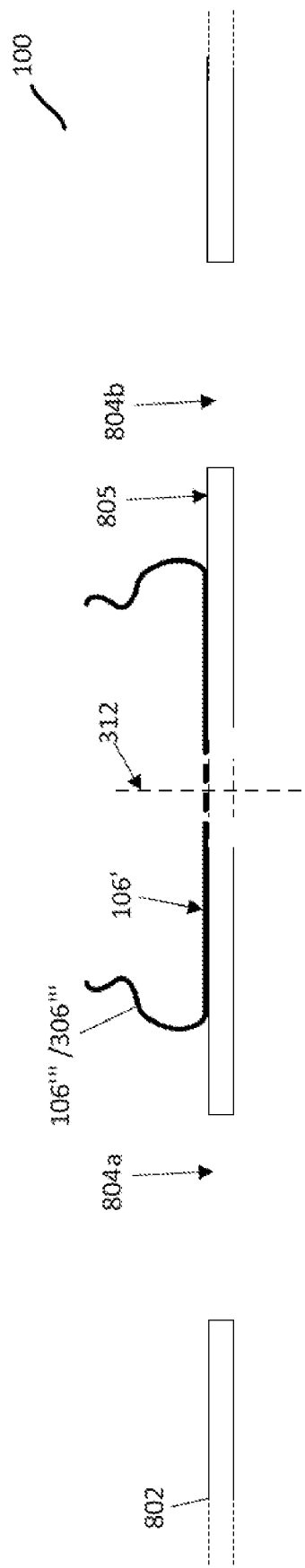

In FIG. 9B, interconnect 106''' is positioned on a surface 805 of substrate 802 for subsequent attachment to fittings 104e and 104f. For example, the one or more connectors 306''' that form interconnect 106''' (e.g., in the illustrated example of FIGS. 3A-3B, a single connector 306' forms interconnect 106' and in the illustrated example of FIGS. 6A-6B, multiple connectors 306'' form interconnect 106'') may be laid across surface 805 of substrate 802 between openings 804a and 804b, or between locations where openings 804a and 804b will be located if openings 804a and 804b are formed after attachment of fittings 104e and 104f, respectively, to substrate 802. Surface 805 may be an exterior surface of flexible body 102, at least at this point during the assembly process (e.g., one or more additional layers may be deposited over surface 805 of substrate 802 at a later stage).

Figure 9C:
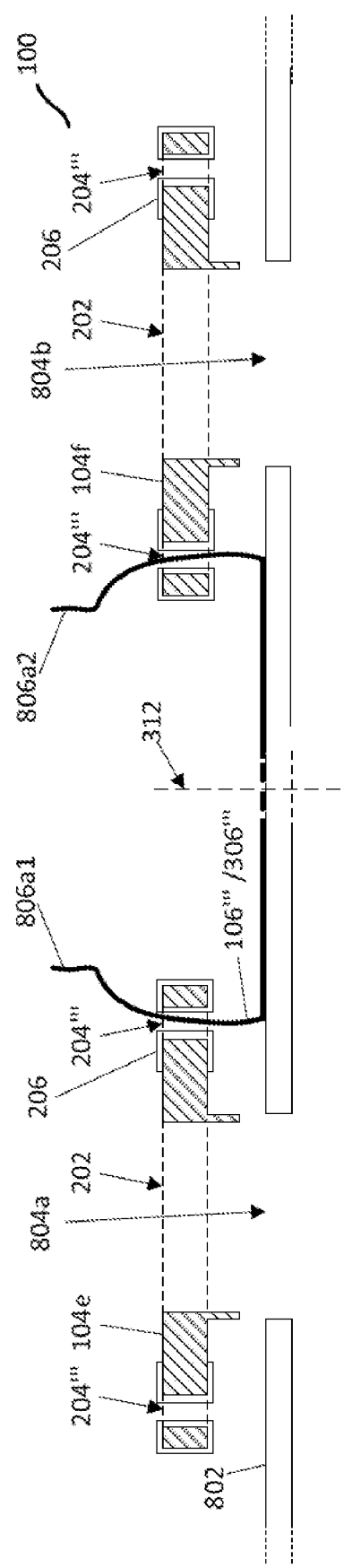

In FIG. 9C, fittings 104e and 104f are received or formed. Fittings 104e and 104f may be formed by milling a metal or composite material, for example. The milling may be controlled using a CNC process. In embodiments in which primer coating 206 is on fittings 104e and 104f, primer coating 206 may be formed by treating the outer portions of fittings 104e and 104f with a polymeric plasma coating process.

Additionally, as shown in FIG. 9C, as fittings 104e and 104f are moved into position (e.g., over openings 804a and 804b, respectively) for attachment to flexible body 102, a first end portion 806a1 of a connector 306''' of interconnect 106''' may be threaded or otherwise inserted through a second opening 204''' of fitting 104e and a second end portion 806a2 of connector 306''' of interconnect 106''' may be threaded or otherwise inserted through a corresponding second opening 204''' of fitting 104f. If interconnect 106''' includes multiple connectors 306''', first end portions 806 of the multiple connectors 306''' may be threaded or otherwise inserted through respective second openings 204''' of fitting 104e and second end portions 806 of the multiple connectors 306''' may be threaded or otherwise inserted through respective corresponding second openings 204''' of fitting 104f.

In FIG. 9D, fittings 104e and 104f are attached to substrate 802 at respective openings 804a and 804b of substrate 802, or at locations where openings 804a and 804b will be located if openings 804a and 804b are formed after attachment of fittings 104e and 104f, respectively. Fittings 104e and 104f may be attached to flexible body 102 in any suitable manner. Example attachment techniques include bolt/washer combinations (e.g., an exposed plate, gasket, and nut-ring flange combination), stitching with a yarn-type material, adhesives, patch attachment structures, or any other suitable attachment technique. In certain embodiments, attaching fitting 104e/104f to substrate 802 102 includes placing fitting 104e/104f on substrate 802 so that the raised portion 200R of fitting 104e/104f extends through opening 804a/804b, and then attaching the outer portion of fitting 104e/104f to flexible body 102 with bolts/washers, yarns, adhesives, or other attachment structures. In embodiments in which primer coating 206 is present, primer coating 206 contacts surface 805 of substrate 802. In embodiments omitting primer coating 206, fitting 104e/104f contacts surface 805 of substrate 802.

In FIG. 9E, interconnect 106'''/connector(s) 306''' may be attached to fittings 104e/104f. Each connector 306''' of interconnect 106''' may be connected to fittings 104e and 104f. This disclosure contemplates attaching interconnect 106'''/connector(s) 306''' to fittings 104e/104f in any suitable manner. For example, a connector 306''' of interconnect 106''' may be threaded or otherwise inserted through respective slot-shaped second openings 204''' of fittings 104e and 104f such that portions of connectors 306''' form loops 308 through the respective slot-shaped second openings 204'''. End portions 806a1 and 806a2 of interconnect 106'''/connector 306''' may be adhered to a primary portion of interconnect 106'''/connector 306''' (the portion of the interconnect 106'''/connector 306''' that spans the coupled fittings 104e and 104f). Additionally or alternatively, end portions 806a1 and 806a2 of interconnect 106'''/connector 306''' may be adhered to each other (e.g., such that interconnect 106'''/connector 306''' forms a continuous loop). Interconnects 106''' (e.g., connector 306''') may be adhered in any suitable manner, examples of which include stitching 310 (see, e.g., FIGS. 3A-3B and 4), welding 410 (see, e.g., FIGS. 6A-6B and 7), clipping (e.g., using a buckle, ratchet, or other type of clip), tying, or another suitable mechanism.

As an example, portions of an interconnect 106'''/connector 306''' may be stitched together using an embroidering machine such as a JGW-0100-650 Technical Embroidering Machine from ZSK. The stitching may be controlled using a CNC process, which determines the placement of stitching 310. Utilizing a CNC process may improve the accuracy and repeatability of the stitching, especially when compared to manual stitching. Manufacturing yield may thus be improved. The CNC process may be one which is capable of controlling the stitching (e.g., needle movement) in three directions (e.g., X-axis, Y-axis, and Z-axis). The stitching may be performed by programming the CNC process for the embroidering machine, and then performing the stitching with the embroidering machine controlled using the CNC process. The CNC process programming may be performed using, e.g., EPCWin from ZSK. Achieving a desired density and strength of stitching 310 may be easier with a CNC process than manual stitching, as CNC processes are less prone to error than manual stitching. As such, the stitching may be performed with a smaller margin of error. Additionally or alternatively, stitching may be performed manually.

To the extent appropriate, connectors 306''' may be trimmed prior to or after coupling to remove excess material. It will be appreciated that what constitutes an end portion 806 of a connector 306 may be relocated relative to what is shown in FIGS. 9C and 9D if a connector 306''' is trimmed.

In FIG. 9F, encapsulant 400 is formed over and among interconnect(s) 106'''(connector(s) 306'''), fittings 104e/104f, and substrate 802. For example, encapsulant 400 may be formed around the outer portion of fittings 104e/104f and at least a portion of each connector 306''' of each interconnect 106'''. Encapsulant 400 also may be formed on at least a portion of primer coating 206 and surface 805 of substrate 802. Encapsulant 400 may be omitted from openings 202, 804a/804b, so that those openings remain unobstructed. Encapsulant 400 may be as described above in connection with other figures, and that description is incorporated by reference without being repeated.

During formation, the material of encapsulant 400 may form strong chemical bonds (such as covalent bonds) with the material(s) of primer coating 206 and substrate 802. Thus, the fuel-tolerant material of encapsulant 400 is chemically bonded to the fuel-tolerant material of primer coating 206 and the fuel-tolerant material of substrate 802.

In FIG. 9G, additional material layers are deposited over substrate 802. For example, a middle layer 808 may be deposited over substrate 802, and an outer layer 810 may be deposited over middle layer 808. Collectively, substrate 802, middle layer 808, and outer layer 810 may form flexible body 102 of fuel cell 100. When flexible body 102 is formed of layers of composite materials, the various layers, along with cover layer 402, may be laminated on each other. Middle layer 808 and outer layer 810 may be as described above.

In the illustrated example, interconnects 106/connectors 306 are sandwiched between/within the layers that make up flexible body 102. In another embodiment, interconnects 106'''/connectors 306''' may be located outside the layers of flexible body 102 (e.g., outside outer layer 810).

Openings 812 extend through encapsulant 400, middle layer 808, and outer layer 810. Openings 812 expose the inner portion of fittings 104e and 104f, and are aligned with openings 202, 804a/804b of fittings 104e and 104f. The openings 202, 804a/804b, and 812 collectively define openings 814. Openings 814 extend through fittings 104e/104f and the layers of flexible body 102. As such, openings 814 define inlets/outlets for fuel cell 100. A rigid fuel line or other apparatus may extend through each opening 814. The openings 202, 804a/804b, and 804 collectively define openings 806. Openings 806 extend through flexible body 102 (e.g., through encapsulant 400, fittings 104e/104f, and flexible body 102). As such, openings 806 define inlets/outlets for fuel cell 100. A rigid fuel line or other apparatus may extend through each opening 806.

As described previously, fuel cell 100 may have any desired quantity of fittings 104. Some or all of the fittings 104 may be coupled together using interconnects 106 in a manner similar to that described with reference to FIGS. 9A-9G. Fittings 104 other than those like fittings 104a and 104b may be used in place of or in addition to fittings 104 like fittings 104a and 104b.

Some variations of the process previously described for FIGS. 8A-8G and 9A-9G are contemplated, and such variations are not limited to the described examples.

As a first example variation, although attachment of fittings 104e and 104f directly to substrate 802 of fuel cell 100 has been described, fittings 104e and 104f may be first formed on separate respective flexible substrates (e.g., potentially of the same material, such as a fuel-tolerant material, as substrate 802) to form respective fuel fitting patches that are then attached to substrate 802 at respective openings 804a and 804b or at locations where respective openings 804a and 804b will be located if openings 804a and 804b are formed after attachment of fittings 104e and 104f. The flexible substrate, encapsulant 400, interconnects 106'''/connector(s) 306''', and fitting 104e/104f may collectively form the fitting patch, which is a pre-formed fitting patch to be attached to a substrate 802 of a fuel cell 100. This disclosure contemplates attaching fittings 104 (e.g., fittings 104e and 104f) to substrate 802/flexible body 102 in any suitable manner.

As another example variation, rather than performing the portions of the process described above with reference to FIGS. 9B-9D, interconnects 106''' (e.g., connector(s) 306''' of interconnects 106''') may be attached to fittings 104 (e.g., fittings 104e and 104f) prior to fittings 104 being moved into position on and/or attached to flexible body 102. For example, one or more interconnects 106''' (e.g., connector(s) 306''' of the one or more interconnects 106''') may be attached to particular fittings 104 prior to those particular fittings 104 being moved into position on and/or attached to flexible body 102. An example of such a technique is described with reference to FIGS. 8A-8G.

As another example variation, rather than being threaded or otherwise inserted through openings 204''' in the direction (e.g., away from flexible body 102) shown in FIGS. 9B-9E, interconnects 106'''/connectors 306''' may be threaded or otherwise inserted through openings in a different direction (e.g., toward flexible body 102) or in varying combinations of directions.

As another example, rather than a first end portion 806a1 of a continuous connector 306''' being inserted through a second opening 204''' of fitting 104e and a second end portion 806a2 of that continuous connector 306''' being inserted through a corresponding second opening 204''' of fitting 104f in FIGS. 9C-9E, this disclosure contemplates separate connectors 306''' being inserted through corresponding second openings 204''' of fittings 104e and 104f, respectively, and then those separate connectors 306''' being coupled together in a manner similar to that described above with reference to FIGS. 8A-8G but otherwise similar to the process described with reference to FIGS. 9A-9G.

Figure 10:
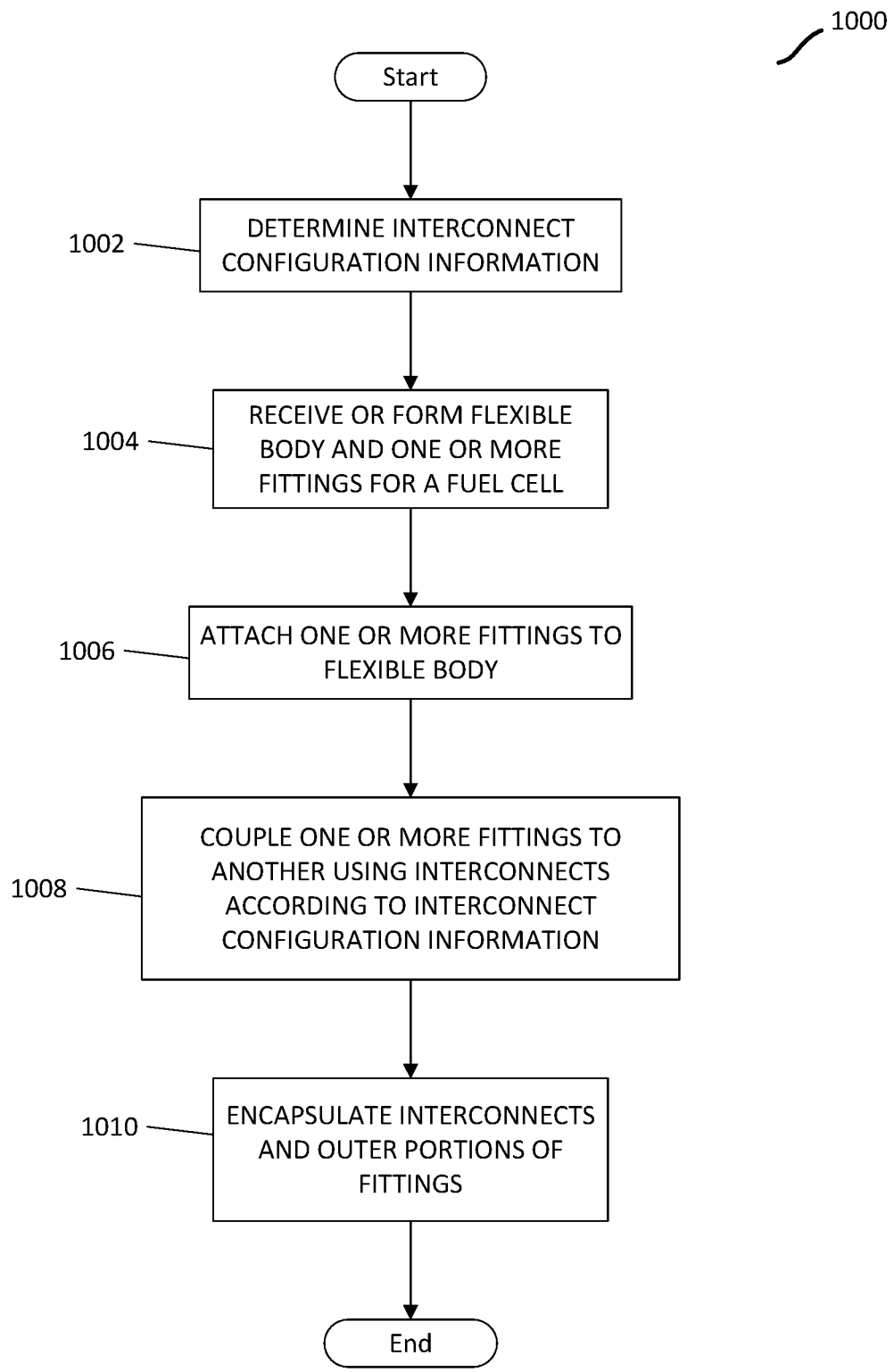
FIG. 10 is a flow diagram of an example method for manufacturing a fuel cell, according to certain embodiments.

FIG. 10 illustrates a flow diagram of an example method 1000 for manufacturing a portion of fuel cell 100, according to certain embodiments. Method 1000 is performed to attach one or more interconnects 106, each of which may include one or more connectors 306, to one or more fittings 104 of fuel cell 100. The one or more fittings 104 may include fittings 104a, 104b, 104c, 104d, 104e, 104f, or any other suitable fittings 104 in any suitable combination. The one or more interconnects 106 may interconnects 106', 106'', 106''', or any other suitable interconnects 106 in any suitable combination. The one or more connectors 306 of each interconnect 106 may include connectors 306', 306'', 306''', or any other suitable connectors 306 in any suitable combination.

At block 1002, interconnect configuration information may be determined. Interconnects 106 may be designed and formed to have a variety of properties, as called for by the design of a fuel cell 100.

As described above, some fittings 104 may be in a high-stress region of a fuel cell 100, other fittings 104 may be in a low-stress region of fuel cell 100, and still other fittings 104 may span both high-stress and low-stress regions of fuel cell 100. Referring back to FIGS. 1A-1B, a fitting 104 at the top side 110A or the bottom side 110B of flexible body 102 may be subject to lower stresses than a fitting 104 at the forward side 110C, aft side 110D, port side 110E, and starboard side 110F of flexible body 102, particularly during a high impact event when flattening of flexible body 102 of fuel cell 100 may occur. More generally, fittings 104 at larger sides of a flexible body 102 may be subject to lower stresses than fittings 104 at smaller sides of a flexible body 102. In certain embodiments, interconnects 106 between a fitting 104 subject to a lower stress and a fitting 104 subject to a higher stress or between a fitting 104 subject to a higher stress and another fitting 104 subject to a higher stress may have greater strength than interconnects 106 between two fittings 104 having a lower stress.

As another example, smaller fittings 104 may be subject to lower stresses than larger fittings 104, particularly during a high impact event when flattening of flexible body 102 of fuel cell 100 may occur. In certain embodiments, interconnects 106 between a smaller fitting 104 and a larger fitting 104 or between two larger fittings 104 may have greater strength than interconnects 106 between two smaller fittings 104. Combinations of these factors, including location of fittings 104 and size of fittings 104, may be considered in determining the appropriate properties for particular interconnects 106. In certain embodiments, all of interconnects 106 for a given fuel cell 100 are the same, which may simplify the assembly process and/or provide other benefits.

Interconnect configuration information may include one or more of the following: the material from which connectors 306 (and thus the interconnect 106 itself) are made, the thickness/density of connectors 306 of interconnects 106, the length of interconnects 106, the quantity of interconnects 106, the quantity of connectors 306 that make up a particular interconnect 106, which fittings 104 to couple using interconnects 106, the technique used to attach interconnect 106 (e.g., the connector(s) 306 of the interconnect) to fittings 104, the technique used to secure the connector(s) 306 of interconnect 106 (e.g., stitching, welding, ratcheting), and/or other suitable factors.

This disclosure contemplates using any suitable techniques to determine appropriate values for the interconnect configuration information, including any or all of the above-listed factors. In certain embodiments, interconnect configuration information may be determined using a modeling technique. Some or all of these factors may be evaluated as part of a model to determine what values to assign to these or other factors while still accomplishing one or more goals (e.g., no leaks during a drop test and/or minimizing weight of fuel cell 100). For example, a finite element analysis (FEA) may be performed using a finite element modeling (FEM) technique to determine appropriate values for any or all of these factors. An FEA technique may allow a drop test of fuel cell 100 to be simulated and modeled without actually dropping a physical version of fuel cell 100.

Using an FEM technique and associated FEA, various drop test conditions (e.g., drop height, impactor stiffness (e.g., the stiffness of the ground, such as concrete or the earth), drop angle, or other suitable conditions) and properties of fuel cell 100 can be varied to gather data and determine the crashworthiness of the version of fuel cell 100 being modeled, including potentially whether any tearing or sheering may occur that might cause leaks in fuel cell 100. The FEA also may be able to indicate how stresses are distributed throughout fuel cell 100.

Properties of fuel cell 100 that might be varied for purposes of performing the FEA modeling may include one or more of the material(s) and other properties (e.g., thickness, rigidity, shape, etc.) of flexible body 102, the locations and other properties (e.g., size, style, shape, etc.) of fittings 104 on flexible body, the material from which connectors 306 (and thus the interconnect 106 itself) are made, the thickness/density of connectors 306 of interconnects 106, the length of interconnects 106, the quantity of interconnects 106, the quantity of connectors 306 that make up a particular interconnect 106, which fittings 104 to couple using interconnects 106, the technique used to attach interconnect 106 (e.g., the connector(s) 306 of the interconnect) to fittings 104, the technique used to secure the connector(s) 306 of interconnect 106 (e.g., stitching, welding, ratcheting), and/or other suitable properties.

Results of the FEA or other type of modeling may be analyzed and adjustments made to the inputs to the analysis until a desirable combination of outcomes is achieved. In certain embodiments, the desirable combination of outcomes may include that no leaks are formed in fuel cell 100 (and particularly for this analysis, at locations where fittings are attached to flexible body 102) and that a particular weight of fuel cell 100 is not exceeded. Over time, certain historical data may be collected that allow a lookup table to be developed and used for determining appropriate combinations of properties for fuel cell 100.

In some scenarios, the size/shape of flexible body 102, the number/locations of fittings 104, and/or the like may be pre-specified due to other constraints, the modeling of interconnects 106 may be built and analyzed according to those pre-specifications. In other scenarios, the size/shape of flexible body 102, the number/locations of fittings 104, and/or the like also may be varied as part of the modeling such that in addition to determining various factors regarding interconnects 106, the size/shape of flexible body 102, the number/locations of fittings 104, and/or the like also may be optimized for particular goals (e.g., minimizing weight while providing adequate crashworthiness/survivability) as part of a given implementation.

At block 1004, flexible body 102 and one or more fittings 104 may be received or formed. To the extent formed, this disclosure contemplates forming flexible body 102 and fittings 104 in any suitable manner, as described above. In certain embodiments, flexible body 102 is formed over a mold using an infusion or other suitable technique, and initially includes a substrate (e.g., substrate 802) over which one or more additional layers are formed subsequent to attaching fittings 104 to substrate 802.

At block 1006, the one or more fittings 104 may be attached to flexible body 102. This disclosure contemplates attaching the one or more fittings 104 to flexible body 102 in any suitable manner, as described above. For example, fittings 104 may be attached to a substrate 802 of flexible body 102 (or to a finished flexible body 102, if appropriate) using various attachment techniques, including bolt/washer combinations (e.g., an exposed plate, gasket, and nut-ring flange combination), stitching with a yarn-type material, adhesives, patch attachment structures, or any other suitable attachment technique.

At block 1008, one or more of fittings 104 may be attached to one another using interconnects 106 according to the determined interconnect configuration information. In certain embodiments, an interconnect 106 includes a strap, and attaching the one or more of fittings 104 to one another using interconnects 106 may include, for each interconnect 106, inserting the strap through a second opening 204 extending through the outer portion of a first fitting 104 and through a second opening 204 extending through the outer portion of a second fitting 104 and forming the strap into at least one closed loop (e.g., through stitching). In certain embodiments, an interconnect 106 includes multiple cords, and attaching the one or more of fittings 104 to one another using interconnects 106 may include, for each interconnect 106, inserting the cords through respective openings 204 extending through the outer portion of a first fitting 104 and through corresponding respective openings 204 extending through the outer portion of a second fitting 104 and forming each cord into at least one closed loop (e.g., through welding).

In certain embodiments, attaching a first elongated interconnect 106 to a first fitting 104 through one or more of the openings 204 extending through the outer portion of the first fitting 104 and attaching the first elongated interconnect 106 to the second fitting 104 through one or more of the openings 204 extending through the outer portion of the second fitting 104 such that the first elongated interconnect 106 couples together the first fitting 104 and the second fitting 104 includes attaching a first connector 306 to the first fitting 104 through a first opening 204 of the openings 204 extending through the outer portion of the first fitting 104, attaching a second connector 306 to the second fitting 104 through a second opening 204 of the openings 204 extending through the outer portion of the second fitting 104, and coupling the first connector 306 to the second connector 306 to form at least a portion of the first elongated interconnect 106.

In certain embodiments, block 1008 is performed prior to and/or simultaneously with block 1006. Example 21. For example, attaching the first connector 306 to the first fitting 104 through the first opening 204 of the openings 204 extending through the outer portion of the first fitting 104 may be performed prior to attaching the first fitting 104 to the substrate 802 for the flexible body 102 of the fuel cell 100, and attaching the second connector 306 to the second fitting 104 through the second opening 204 of the openings 204 extending through the outer portion of the second fitting 104 may be performed prior to attaching the second fitting 104 to substrate 802.

At block 1010, the interconnects 106 and outer portions of the one or more fittings 104 may be encapsulated using an encapsulant 400. For example, block 1010 may include encapsulating the openings 204 extending through the outer portions of first and second fittings 104 and at least portions of the interconnect 106 that couples the first and second fittings 104 with an encapsulant 400. Encapsulant 400 may extend through openings 204 extending through the outer portions of the first and second fittings 104. In certain embodiments, encapsulation is performed prior to securing connectors 306 of interconnect 106 to a fitting 104 and prior to attaching the fitting 104 to the substrate 802/flexible body 102.

Figure 11:
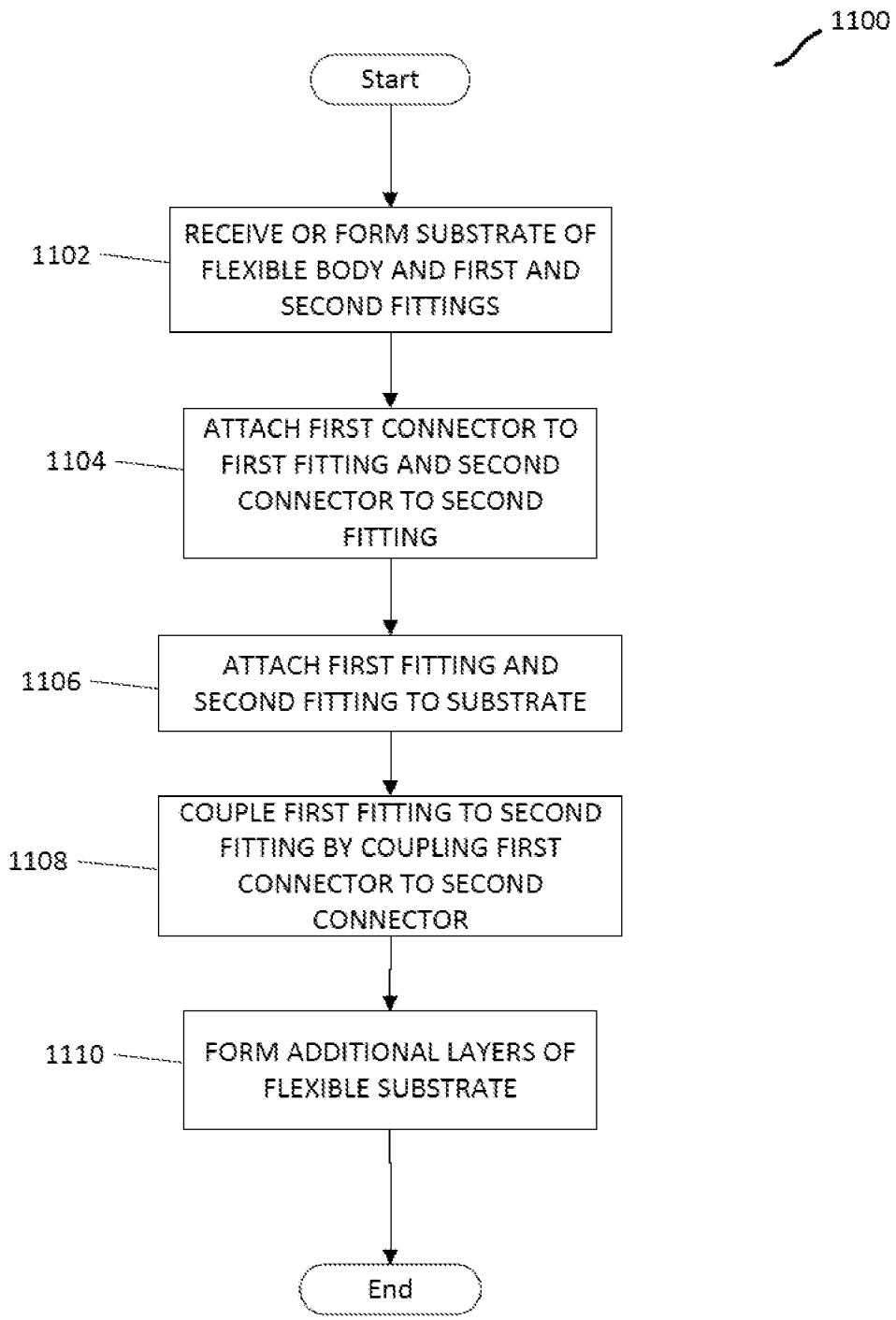
FIG. 11 is a flow diagram of an example method for interconnecting first and second fittings of a fuel cell, according to certain embodiments.

FIG. 11 illustrates a flow diagram of an example method 1100 for interconnecting first and second fittings 104 of a fuel cell 100, according to certain embodiments.

At block 1102, substrate 802 and first and second fittings 104 may be received or formed. To the extent formed, this disclosure contemplates forming flexible body 102 and first and second fittings 104 in any suitable manner, as described above. In certain embodiments, flexible body 102 is formed over a mold using an infusion or other suitable technique, and initially includes a substrate (e.g., substrate 802) over which one or more additional layers are formed subsequent to attaching fittings 104 to substrate 802. The one or more fittings 104 may include fittings 104a, 104b, 104c, 104d, 104e, 104f, or any other suitable fittings 104 in any suitable combination.

At block 1104, a first connector 306 is attached to the first fitting 104 and a second connector 306 is attached to a second fitting 104. For example, attaching the first connector 306 to the first fitting 104 may include inserting the first connector 306 through one or more of the openings 204 extending through the outer portion of the first fitting 104 and encapsulating, using an encapsulant 400, the openings 204 extending through the outer portion of the first fitting 104 and at least portions of the connector 306. Encapsulant 400 may extend through openings 204 extending through the outer portions of the first fitting 104. A similar process may be performed for attaching the second connector 306 to the second fitting 104. Of course, additional connectors 306 may be attached to the first and second fittings 104, if appropriate, such as when the interconnect 106 between the first and second fittings 104 includes multiple connectors 306 connecting the first and second fittings 104 or when a fitting is connected to one or more additional fittings 104 (or itself) using an interconnect 106. These additional connectors 306 may be inserted through second openings 204 of the appropriate fitting 104 prior to the encapsulation process. Connectors 306 may include straps, cords, or any other suitable type of connector, as described herein.

At step 1106, the first and second fittings 104, with connectors 306 attached thereto, are attached to substrate 802. This disclosure contemplates attaching first and second fittings 104 to substrate 802 in any suitable manner, as described above.

At block 1108, first and second fittings 104 are coupled to one another using interconnect 106. For example, first and second fittings 104 may be coupled together by coupling the connector 306 attached to the first fitting 104 to the connector 306 attached to the second fitting 104 in any suitable manner, as described above. For example, connectors 306 may be coupled via stitching 310 (see, e.g., FIGS. 3A-3B, 4, and 8F), welding 410 (see, e.g., FIGS. 6A-6B and 7), clipping (e.g., using a buckle, ratchet, or other type of clip), tying, or another suitable mechanism. Additionally or alternatively, the first and second fittings 104 could be a same fitting such that a fitting 104 is coupled to itself using an interconnect 106. Interconnects 106 may interconnect 106', 106'', 106''', or any other suitable interconnect 106. The one or more connectors 306 of interconnect 106 may include one or more connectors 306', 306'', 306''', or any other suitable connectors 306 in any suitable combination.

At block 1110, one or more additional layers of flexible body 102 may be formed, if appropriate. For example, one or more additional material layers may be deposited over substrate 802. As a particular example, a middle layer 808 may be deposited over substrate 802, and an outer layer 810 may be deposited over middle layer 808. Collectively, substrate 802, middle layer 808, and outer layer 810 may form flexible body 102 of fuel cell 100. When flexible body 102 is formed of layers of composite materials, the various layers, along with cover layer 402, may be laminated on each other. Middle layer 808 and outer layer 810 may be as described above.

In the illustrated example, interconnects 106/connectors 306 are sandwiched between/within the layers that make up flexible body 102. In another embodiment, interconnects 106'''/connectors 306''' may be located outside the layers of flexible body 102 (e.g., outside outer layer 810).

Although described in the context of fuel cells, some embodiments may be utilized to attach other types of rigid fittings to other types of flexible substrates. For example, similar processes could be performed to attach cleats to a sponson. Likewise, similar process could be performed to embed smart hardware into tanks, sponsons, sonobuoys, or the like.

Further, some embodiments contemplate use of fittings 104 in other applications. Specifically, fittings 104 may be used to attach a fuel cell 100 to other elements besides a rigid fuel line. As noted above, some of fittings 104 may be utilized to fluidly coupled multiple fuel cells 100 to one another. Likewise, other fuel cells 100 may have fittings 104 that are reserved for adding fuel to or removing fuel from a fuel cell 100.

Although this disclosure describes particular process/method steps as occurring in a particular order (see, for example, FIGS. 8A-8G, 9A-9G, 10. and 11), this disclosure contemplates the process/method steps occurring in any suitable order and/or simultaneously. Furthermore, this disclosure contemplates omitting certain steps and/or performing additional steps as may be appropriate for a given implementation.

Figure 12A:
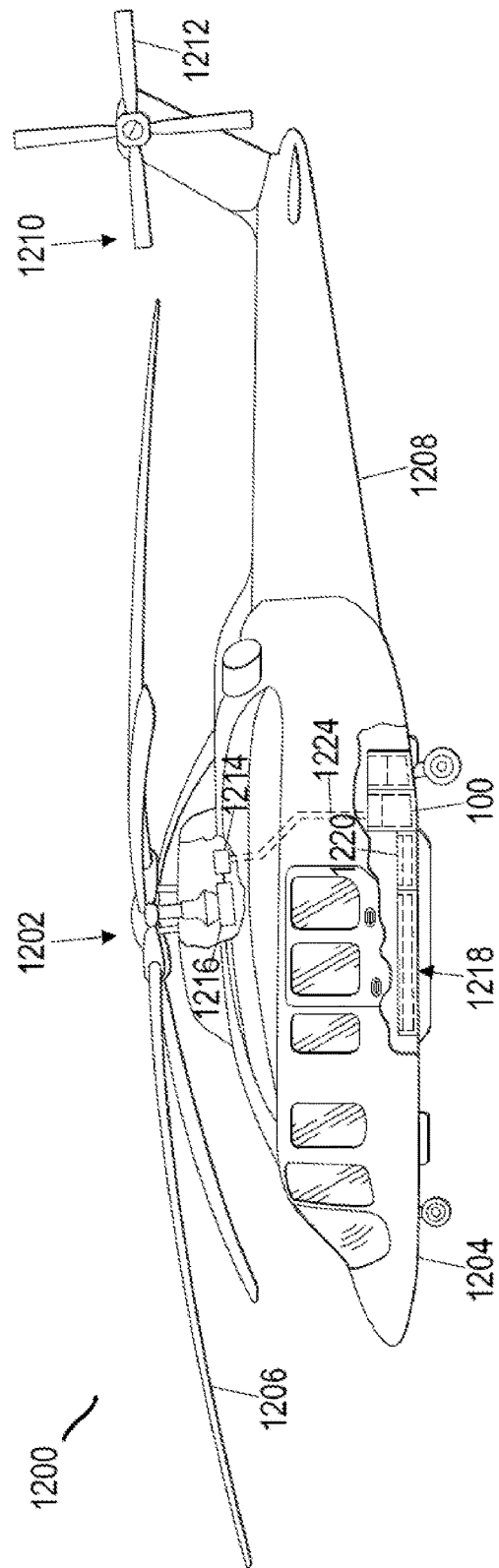
FIGS. 12A-12B are schematic views of a rotorcraft, according to certain embodiments.
Figure 12B:
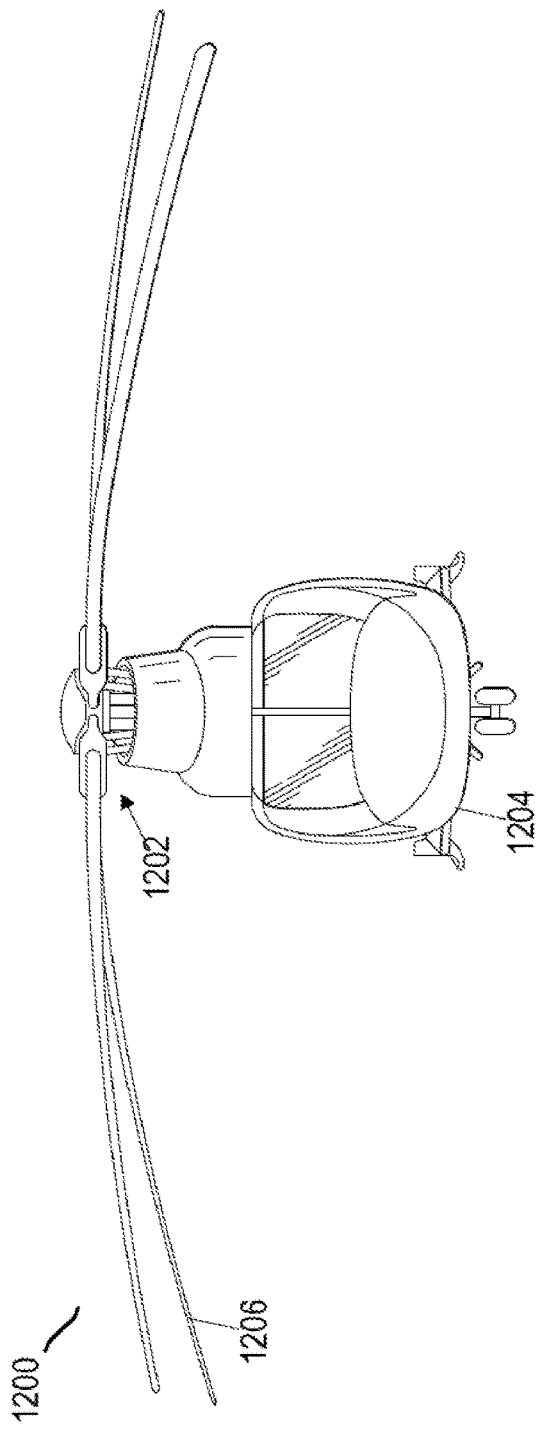

FIGS. 12A-12B are schematic views of a rotorcraft 1200, in accordance with some embodiments. Rotorcraft 1200 includes a main rotor hub assembly 1202, which is rotatable relative to a fuselage 1204 of rotorcraft 1200. Main rotor hub assembly 1202 includes main rotor blades 1206. The pitch of main rotor blades 1206 can be collectively and/or cyclically manipulated to selectively control direction, thrust, and lift of rotorcraft 1200. A tailboom 1208 extends from fuselage 1204, and a tail rotor hub assembly 1210 is attached to an aft portion of tailboom 1208. Tail rotor hub assembly 1210 includes a tail rotor 1212, which is rotatable relative to tailboom 1208. Tail rotor 1212 may collectively provide thrust in the opposite direction as the rotation of main rotor hub assembly 1202, so as to counter torque effects created by main rotor blades 1206.

The components of the rotorcraft 1200 (e.g., main rotor hub assembly 1202 and tail rotor hub assembly 1210) are powered by one or more engines 1214. For example, engines 1214 may power main rotor hub assembly 1202 via a main rotor gearbox 1216. Engines 1214 may also power other components, such as alternators, cooling units, or the like. Rotorcraft 1200 further includes a fuel system 1218, which includes a fuel cell assembly 1220. Fuel cell assembly 1220 may be located in a lower portion of fuselage 1204. Fuel cell assembly 1220 is coupled to fuselage 1204, and may be fully or partially integral with fuselage 1204, or may be an independent component which is secured to fuselage 1204. Fuel cell assembly 1220 may be located elsewhere in rotorcraft 1200. Fuel cell assembly 1220 includes one or more fuel cells 100 for storing fuel. The fuel contained in fuel cells 100 is used as an energy source to power the various systems of rotorcraft 1200 such as main rotor hub assembly 1202 and tail rotor hub assembly 1210. For example, fuel system 1218 may be operable to deliver fuel stored in fuel cells 100 to engines 1214. Fuel cells 100 may be fluidly coupled to components of rotorcraft 1200, such as engines 1214, with one or more fuel lines 1224. In certain embodiments, fuel lines 1224 are hoses formed of a rigid material, such as a metal, such as aluminum, steel, or the like.

Embodiments of this disclosure may provide none, some, or all of the following technical advantages. Furthermore, other advantages may be described in or understood from this disclosure.

Certain embodiments may improve the crashworthiness, or crash resistance, of the fuel system of a vehicle. The crashworthiness of a fuel cell may include the survivability of a fuel cell. Survivability, as it relates to certain embodiments of this disclosure, may include whether the fuel cell (e.g., fuel cell 100) develops leaks at areas proximate where rigid fittings (e.g., fittings 104) are attached to the flexible body (e.g., flexible body 102) of the fuel cell (e.g., fuel cell 100). Whether or not a drop test is used to evaluate the crashworthiness/survivability of a fuel cell (e.g., fuel cell 100), embodiments of this disclosure may improve the crashworthiness/survivability of a fuel cell (e.g., fuel cell 100) by reducing or eliminating the likelihood that a leak will occur at or near an area of the fuel cell where the rigid fittings are attached to the flexible fuel cell body. Use of interconnects 106 to couple fittings 104 located on flexible body 102 to one another, or even to attach fittings 104 to themselves, may improve the reliability of the junction between fittings 104 and flexible body 102, as interconnects 106 buffer stress on those junctions by allowing fittings 104 to share the load of stresses. Certain embodiments increase the survivability of a collapsible/flexible fuel cell 100 by decreasing the deformation experienced by the flexible body 102 during a catastrophic event, such as a crash. Certain embodiments provide strength and stiffening at precise locations that are most vulnerable to failure.

As described above, additional forces also may act on the fuel cell during such an impact event, as well as during other types of events (e.g., a projectile, such as a bullet or shrapnel, puncturing flexible body 102). Those additional forces may include, for example, HRAM forces, which involve the forces applied by the fluid contained in a fuel cell during such an impact event. The load sharing introduced by interconnects 106 may reduce or eliminate stress resulting from HRAM forces at locations where rigid fittings 104 abut the flexible body 102, which may reduce or eliminate the possibility of tearing at those locations.

Certain embodiments may reduce the amount of flattening of flexible body 102 that occurs during an impact event. Additionally or alternatively, certain embodiments may reduce the time for flexible body 102 to regain its shape after flatting as a result of an impact event.

Certain embodiments allow the manufacture of lighter weight and more flexible fuel cells. For example, certain embodiments may allow a reduction or elimination of stiffening elements around some or all of fittings 104. Such stiffening elements could be used to buffer fittings from stress, including as a result of flattening during an impact event, by providing a gradual rigidity transition from the flexible material of the fuel cell body to the rigid material of the fittings. Such stiffening elements can take many forms, including, for example, adding additional/different layers to the fuel body around fittings to stiffen those areas, attaching rigid fittings to a flexible fuel cell body with an attachment structure that is less rigid than the fittings but more rigid than the flexible fuel cell body, or using other techniques. However, these stiffening elements may reduce the overall flexibility of the fuel cell by creating areas of the fuel cell body that have reduced flexibility and may increase the overall weight of the fuel cell.

In certain embodiments, without sacrificing the survivability of the fuel cell 100, the sharing of stress loads provided by coupling fittings 104 using interconnects 106 may allow the use of these stiffening elements to be reduced or eliminated, which may allow greater areas of the flexible fuel cell body to remain flexible and may reduce overall weight of the fuel cell.

In certain embodiments, use of interconnects 106 may allow even more flexible materials for flexible body 102 to be used. As described above, the stiffness gradient at locations where fittings 104 are attached to fuel cell 100 can lead to tearing of flexible body 102 at those locations, particularly during certain high impact events like crashes. Use of interconnects 106 may reduce or eliminate stress at those locations, which may allow even more flexible materials for flexible body 102 to be used despite such flexible materials potentially increasing the stiffness gradient at such locations.

Certain embodiments may reduce the complexity of, time for, and/or materials for construction flexible fuel cells relative to conventional techniques. Each of these example potential advantages are described below.

For example, certain embodiments may reduce complexity for constructing flexible fuel cells. Certain conventional techniques may include independently determined yarn attachment structures that are tied into the flexible bladder of the fuel cell. Depending on the location of a fitting, the density and length of these yarn attachment structures may vary greatly. The associated amount of adhesive used to tie in these yarns to the flexible bladder also may vary greatly.

As another example, certain conventional techniques for attaching fittings to flexible fuel cell bladders involve stringing yarns through openings in fittings and into one or more layers of the flexible fuel cell bladder and/or into one or more layers of a patch that is to be coupled to the flexible fuel cell bladder. These yarn-stringing processes can be labor intensive and prone to errors. Certain embodiments of this disclosure reduce or eliminate the use of such yarns and associated processes to attach fittings 104 to flexible body 102.

As another example, certain embodiments may reduce the overall added weight, relative to solutions that incorporate stiffening elements at locations where rigid fittings are attached to a flexible body of a fuel cell for example, without sacrificing and/or possibly while still improving survivability of the fuel cell. In certain embodiments, interconnects 106 (e.g., connectors 306 of interconnects 106) are made of relatively lightweight material that does not contribute significantly to the overall weight of fuel cell 100 and yet still maintains or improves survivability of the fuel cell 100. Furthermore, in certain embodiments, use of interconnects 106 may allow other measures for attempting to reduce or eliminate shearing at locations where fittings 104 are attached to flexible body 102 (e.g., increasing the weight and rigidity of flexible body 102 at areas surrounding fittings, possibly using additional layers within a flexible bladder, adhesives, and/or yarns for attaching fittings to the flexible bladder) to be omitted, in whole or in part, which may contribute to the reduction in weight of fuel cell 100.

The weight of fuel cell 100 thus may be reduced, which is particularly advantageous when fuel cell 100 is used for an aircraft, potentially increasing fuel efficiency and providing other benefits for rotorcraft 1100. For example, lighter weight fuel cells 100 may free up payload for installing other survivability technologies. As just one particular example, at least in part by reducing the amount of materials used, certain embodiments of this application may reduce the weight of the materials used for constructing an otherwise similar fuel cell by 25% to 150%. It should be understood that these values are provided as examples, and that a particular configuration might or might not reduce the weight of a fuel cell relative to conventional techniques and/or may do so by an amount outside this example range.

Embodiments of this disclosure can be engineered to specific fuel cell designs, such as to particular flexible body shapes and sizes, flexible body materials, fuel cell environments (e.g., use in a car vs. an aircraft), survivability levels (e.g., surviving a 50-foot drop test vs. a 65-foot drop test with a leak forming at the area where the rigid fittings 104 are attached to flexible body 102), and other design variations. For example, the strength of interconnects 106, which fittings 104 to couple together using interconnects 106, whether and how to vary the strength of interconnects 106 and other factors, all while potentially considering the added weight of interconnects 106, may allow a desirable balance between survivability and added weight to be achieved. In certain embodiments, an FEA or other analysis may be performed using an FEM or other suitable model to determine appropriate designs for interconnects 106.

In certain embodiments, one or more interconnects 106 could incorporate conductive material, which may allow interconnects 106 to improve electrostatic discharge performance and thereby potentially improve safety of a vehicle or other machine that incorporates a fuel cell (e.g., fuel cell 100) having interconnects (e.g., interconnects 106) that include conductive material by reducing the possibility of a fire or explosion. As just one example, the conductive material may be any suitable conductive material and may be incorporated into the material of interconnects 106 (e.g., the material of connectors 306) in any suitable manner.

Although described with reference to fuel cells, embodiments of this disclosure may be used with respect to any type of flexible container for storing any suitable type of fluid in any suitable context. For example, embodiments of this disclosure may be used with containers other than fuel cells, fluids other than fuel, and applications other than vehicles.

Example embodiments of this disclosure are summarized here. Other embodiments can also be understood from the entirety of the specification as well as the claims filed herein.

Example 1. A fuel cell includes a flexible body and first and second fittings attached to the flexible body. The first fitting includes a first opening configured for ingress or egress of a fluid, and includes second openings extending through an outer portion of the first fitting. The second fitting includes a first opening configured for ingress or egress of a fluid, and includes second openings extending through an outer portion of the second fitting. The first and second fittings are more rigid than the flexible body. The fuel cell further includes a first elongated interconnect attached to the first fitting through one or more of the second openings extending through the outer portion of the first fitting and connected to the second fitting through one or more of the second openings extending through the outer portion of the second fitting such that the first elongated interconnect couples together the first and second fittings.

Example 2. The fuel hose of Example 1, where the second openings extending through the outer portion of the first fitting and the second openings extending through the outer portion of the second fitting are elongated slots, the first elongated interconnect including a strap inserted through an opening of the second openings extending through the outer portion of the first fitting and inserted through an opening of the second openings extending through the outer portion of the second fitting, the strap being secured to the first fitting and the second fitting using at least one closed loop.

Example 3. The fuel hose of Example 2, where the strap includes webbing formed of a synthetic polymer material.

Example 4. The fuel hose of any one of Examples 1-3, where the second openings extending through the outer portion of the first fitting and the second openings extending through the outer portion of the second fitting are circular, the first elongated interconnect including a plurality of cords inserted through respective openings of the second openings extending through the outer portion of the first fitting and inserted through corresponding respective openings of the second openings extending through the outer portion of the second fitting, each cord of the plurality of cords being secured to the first fitting and the second fitting using at least one closed loop.

Example 5. The fuel hose of Example 4, where the cords of the plurality of cords are formed of a material that includes resilient rubber material.

Example 6. The fuel hose of any one of Examples 1-5, where the first elongated interconnect includes a first closed loop inserted through the opening of the second openings extending through the outer portion of the first fitting, and the first elongated interconnect includes a second closed loop inserted through the opening of the second openings extending through the outer portion of the second fitting, the first closed loop and the second closed loop being distinct closed loops.

Example 7. The fuel hose of any one of Examples 1-6, where the first elongated interconnect includes a first connector inserted through the opening of the second openings extending through the outer portion of the first fitting and a second connector inserted through the opening of the second openings extending through the outer portion of the second fitting, the first connector and the second connector being coupled together to form at least one closed loop.

Example 8. The fuel hose of any one of Examples 1-5, where the first elongated interconnect includes a connector and an intermediate fastener, the connector being attached to the intermediate fastener and the intermediate fastener being attached to the first fitting through the opening of the second openings extending through the outer portion of the first fitting.

Example 9. The fuel hose of any one of Examples 1-8, where the flexible body includes a first surface and a second surface, the second surface being separated from the first surface by an angled edge of the flexible body; and a path of the first elongated interconnect traverses the angled edge of the flexible body, the angled edge being between the first fitting and the second fitting.

Example 10. The fuel hose of any one of Examples 1-9, where a portion of the first interconnect between the first fitting and the second fitting is sandwiched between layers of the flexible body.

Example 11. The fuel hose of any one of Examples 1-10, where the elongated interconnect includes a flexible base material and a conductive material.

Example 12. The fuel hose of any one of Examples 1-11, further including a third fitting attached to the flexible body, the third fitting including openings extending through an outer portion of the third fitting; and a second elongated interconnect attached to the third fitting through one or more of the openings extending through the outer portion of the first fitting to a first side of the third fitting, the second elongated interconnect extending around a perimeter of the flexible body and attached to the third fitting through one or more of the openings extending through the outer portion of the third fitting to a second side of the third fitting.

Example 13. The fuel hose of any one of Examples 1-12, further including a fourth fitting attached to the flexible body; and a second elongated interconnect attached to the first fitting through one or more of the second openings extending through the outer portion of the first fitting and connected to the fourth fitting such that the second elongated interconnect couples together the first fitting and the fourth fitting.

Example 14. A rotorcraft includes a fuel cell that includes a flexible body defining a cavity for storing fluid, fittings attached to the flexible body at respective locations of the flexible body, and interconnects. Each interconnect includes an elongated connector that is attached to a corresponding pair of fittings such that the corresponding pair of fittings are attached together via the interconnect. The rotorcraft further includes a fuel line attached to the fuel cell via one or more of the fittings and an engine connected to the fuel line.

Example 15. The rotorcraft of Example 14, where the elongated connector of a first interconnect of the plurality of interconnects is inserted at through an opening in an outer portion of a first fitting of the corresponding pair of fittings and is inserted through an opening in an outer portion of a second fitting of the corresponding pair of fittings.

Example 16. The rotorcraft of any one of Examples 14-15, where the elongated connector of a first interconnect of the plurality of interconnects is a first elongated connector of the first interconnect, the first interconnect including the first elongated connector and a second elongated connector, both the first elongated connector and the second elongated connector being attached to the corresponding pair of fittings of the plurality of fittings.

Example 17. A method includes attaching first and second fittings to a flexible body of a fuel cell. The first fitting includes openings extending through an outer portion of the first fitting, and the second fitting includes openings extending through an outer portion of the second fitting. The method includes attaching an elongated interconnect to the first fitting through one or more of the openings extending through the outer portion of the first fitting and attaching the elongated interconnect to the second fitting through one or more of the openings extending through the outer portion of the second fitting such that the elongated interconnect couples together the first and second fittings.

Example 18. The method of Example 17, where the first elongated interconnect includes a strap and attaching the first elongated interconnect to the first fitting through one or more of the openings extending through the outer portion of the first fitting and attaching the first elongated interconnect to the second fitting through one or more of the openings extending through the outer portion of the second fitting includes: inserting the strap through an opening extending through the outer portion of the first fitting and through an opening extending through the outer portion of the second fitting; and forming the strap into at least one closed loop through stitching.

Example 19. The method of Example 17, where the first elongated interconnect includes a plurality of cords and attaching the first elongated interconnect to the first fitting through one or more of the openings extending through the outer portion of the first fitting and attaching the first elongated interconnect to the second fitting through one or more of the openings extending through the outer portion of the second fitting includes: inserting the plurality of cords through respective openings of the openings extending through the outer portion of the first fitting and through corresponding respective openings of the openings extending through the outer portion of the second fitting; and forming each cord of the plurality of cords into at least one respective closed loop through welding.

Example 20. The method of any one of Examples 17-19, where attaching the first elongated interconnect to the first fitting through one or more of the openings extending through the outer portion of the first fitting and attaching the first elongated interconnect to the second fitting through one or more of the openings extending through the outer portion of the second fitting such that the first elongated interconnect couples together the first fitting and the second fitting includes: attaching a first connector to the first fitting through a first opening of the openings extending through the outer portion of the first fitting; attaching a second connector to the second fitting through a second opening of the openings extending through the outer portion of the second fitting; and coupling the first connector to the second connector to form at least a portion of the first elongated interconnect.

Example 21. The method of any one of Examples 17-20, where: attaching the first connector to the first fitting through the first opening of the openings extending through the outer portion of the first fitting is performed prior to attaching the first fitting to the substrate for the flexible body of the fuel cell; and attaching the second connector to the second fitting through the second opening of the openings extending through the outer portion of the second fitting is performed prior to attaching the second fitting to the substrate for the flexible body of the fuel cell.

Example 22. The method of any one of Examples 17-21, further including: encapsulating the openings extending through the outer portion of the first fitting and at least a first portion of the first elongated interconnect with an encapsulant, the encapsulant extending through the openings extending through the outer portion of the first fitting; and encapsulating the openings extending through the outer portion of the second fitting and at least a second portion of the first elongated interconnect with an encapsulant, the encapsulant extending through the openings extending through the outer portion of the first fitting.

Illustrative embodiments of the system and method of the present disclosure are described herein. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. A fuel cell comprising:
a flexible body;
a first fitting attached to the flexible body, the first fitting comprising a first opening configured for ingress or egress of a fluid, and further comprising second openings extending through an outer portion of the first fitting;
a second fitting attached to the flexible body, the second fitting comprising a first opening configured for ingress or egress of a fluid, and further comprising second openings extending through an outer portion of the second fitting, the first and second fittings being more rigid than the flexible body; and
a first elongated interconnect attached to the first fitting through one or more of the second openings extending through the outer portion of the first fitting and connected to the second fitting through one or more of the second openings extending through the outer portion of the second fitting such that the first elongated interconnect couples together the first fitting and the second fitting.

2. The fuel cell of claim 1, wherein:
the second openings extending through the outer portion of the first fitting and the second openings extending through the outer portion of the second fitting are elongated slots; and
the first elongated interconnect comprises a strap inserted through an opening of the second openings extending through the outer portion of the first fitting and inserted through an opening of the second openings extending through the outer portion of the second fitting, the strap being secured to the first fitting and the second fitting using at least one closed loop.

3. The fuel cell of claim 2, wherein the strap comprises webbing formed of a synthetic polymer material.

4. The fuel cell of claim 1, wherein:
the second openings extending through the outer portion of the first fitting and the second openings extending through the outer portion of the second fitting are circular; and
the first elongated interconnect comprises a plurality of cords inserted through respective openings of the second openings extending through the outer portion of the first fitting and inserted through corresponding respective openings of the second openings extending through the outer portion of the second fitting, each cord of the plurality of cords being secured to the first fitting and the second fitting using at least one closed loop.

5. The fuel cell of claim 4, wherein the cords of the plurality of cords are formed of a material that comprises resilient rubber material.

6. The fuel cell of claim 1, wherein:
the first elongated interconnect comprises a first closed loop inserted through the opening of the second openings extending through the outer portion of the first fitting; and
the first elongated interconnect comprises a second closed loop inserted through the opening of the second openings extending through the outer portion of the second fitting, the first closed loop and the second closed loop being distinct closed loops.

7. The fuel cell of claim 1, wherein the first elongated interconnect comprises a first connector inserted through the opening of the second openings extending through the outer portion of the first fitting and a second connector inserted through the opening of the second openings extending through the outer portion of the second fitting, the first connector and the second connector being coupled together to form at least one closed loop.

8. The fuel cell of claim 1, wherein the first elongated interconnect comprises a connector and an intermediate fastener, the connector being attached to the intermediate fastener and the intermediate fastener being attached to the first fitting through the opening of the second openings extending through the outer portion of the first fitting.

9. The fuel cell of claim 1, wherein:
the flexible body comprises a first surface and a second surface, the second surface being separated from the first surface by an angled edge of the flexible body; and
a path of the first elongated interconnect traverses the angled edge of the flexible body, the angled edge being between the first fitting and the second fitting.

10. The fuel cell of claim 1, wherein a portion of the first elongated interconnect between the first fitting and the second fitting is sandwiched between layers of the flexible body.

11. The fuel cell of claim 1, wherein the first elongated interconnect comprises:
a flexible base material; and
a conductive material.

12. The fuel cell of claim 1, further comprising:
a third fitting attached to the flexible body, the third fitting comprising openings extending through an outer portion of the third fitting; and
a second elongated interconnect attached to the third fitting through one or more of the openings extending through the outer portion of the first fitting to a first side of the third fitting, the second elongated interconnect extending around a perimeter of the flexible body and attached to the third fitting through one or more of the openings extending through the outer portion of the third fitting to a second side of the third fitting.

13. The fuel cell of claim 1, further comprising:
a third fitting attached to the flexible body; and
a second elongated interconnect attached to the first fitting through one or more of the second openings extending through the outer portion of the first fitting and connected to the third fitting such that the second elongated interconnect couples together the first fitting and the third fitting.

14. A rotorcraft, comprising:
a fuel cell, the fuel cell comprising:
a flexible body;
a first fitting attached to the flexible body, the first fitting comprising a first opening configured for ingress or egress of a fluid, and further comprising second openings extending through an outer portion of the first fitting;
a second fitting attached to the flexible body, the second fitting comprising a first opening configured for ingress or egress of a fluid, and further comprising second openings extending through an outer portion of the second fitting, the first and second fittings being more rigid than the flexible body; and
a first elongated interconnect attached to the first fitting through one or more of the second openings extending through the outer portion of the first fitting and connected to the second fitting through one or more of the second openings extending through the outer portion of the second fitting such that the first elongated interconnect couples together the first fitting and the second fitting;
a fuel line attached to the fuel cell via at least one of the first fitting or the second fitting; and
an engine connected to the fuel line.

15. The rotorcraft of claim 14, wherein:
the first elongated interconnect comprises a first closed loop inserted through the opening of the second openings extending through the outer portion of the first fitting; and
the first elongated interconnect comprises a second closed loop inserted through the opening of the second openings extending through the outer portion of the second fitting, the first closed loop and the second closed loop being distinct closed loops.

16. The rotorcraft of claim 14, wherein the first elongated interconnect comprises a first connector inserted through the opening of the second openings extending through the outer portion of the first fitting and a second connector inserted through the opening of the second openings extending through the outer portion of the second fitting, the first connector and the second connector being coupled together to form at least one closed loop.

17. The rotorcraft of claim 14, wherein the first elongated interconnect comprises a connector and an intermediate fastener, the connector being attached to the intermediate fastener and the intermediate fastener being attached to the first fitting through the opening of the second openings extending through the outer portion of the first fitting.

18. The rotorcraft of claim 14, wherein:
the flexible body comprises a first surface and a second surface, the second surface being separated from the first surface by an angled edge of the flexible body; and
a path of the first elongated interconnect traverses the angled edge of the flexible body, the angled edge being between the first fitting and the second fitting.

19. The rotorcraft of claim 14, further comprising:
a third fitting attached to the flexible body, the third fitting comprising openings extending through an outer portion of the third fitting; and
a second elongated interconnect attached to the third fitting through one or more of the openings extending through the outer portion of the first fitting to a first side of the third fitting, the second elongated interconnect extending around a perimeter of the flexible body and attached to the third fitting through one or more of the openings extending through the outer portion of the third fitting to a second side of the third fitting.

20. The rotorcraft of claim 14, further comprising:
a third fitting attached to the flexible body; and
a second elongated interconnect attached to the first fitting through one or more of the second openings extending through the outer portion of the first fitting and connected to the third fitting such that the second elongated interconnect couples together the first fitting and the third fitting.

* * * * *